(12) United States Patent
Guo

(10) Patent No.: US 12,094,209 B2
(45) Date of Patent: Sep. 17, 2024

(54) VIDEO DATA PROCESSING METHOD AND APPARATUS, DEVICE, AND MEDIUM

(71) Applicant: Tencent Technology (Shenzhen) Company Limited, Guangdong (CN)

(72) Inventor: Hui Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 17/951,621

(22) Filed: Sep. 23, 2022

(65) Prior Publication Data

US 2023/0012732 A1 Jan. 19, 2023

Related U.S. Application Data

(63) Continuation of application No. PCT/CN2021/133035, filed on Nov. 25, 2021.

(30) Foreign Application Priority Data

Dec. 2, 2020 (CN) .......................... 202011390109.2

(51) Int. Cl.
 *G06V 20/40* (2022.01)
(52) U.S. Cl.
 CPC .............. *G06V 20/49* (2022.01); *G06V 20/46* (2022.01)
(58) Field of Classification Search
 CPC ...... G06V 20/49; G06V 20/46; G06V 10/761; G06V 10/763; H04N 21/8456;
 (Continued)

(56) References Cited

U.S. PATENT DOCUMENTS

2020/0322684 A1 10/2020 Dong et al.
2022/0188352 A1\* 6/2022 Wu ........................ G06F 16/739

FOREIGN PATENT DOCUMENTS

| CN | 103593464 A | 2/2014 |
| CN | 110139159 A | 8/2019 |

(Continued)

OTHER PUBLICATIONS

English_Translation_of_Chinese_Publication_CN111105819_05-2020 (Year: 2020).*

(Continued)

*Primary Examiner* — Loi H Tran
(74) *Attorney, Agent, or Firm* — Sughrue Mion, PLLC

(57) ABSTRACT

Embodiments of the disclosure provide a data processing method and apparatus, a device, and a medium. The method includes: performing video analysis on video data of a target video to obtain a plurality of video segments; determining a video template associated with a target user from a video template database based on a user portrait of the target user, and obtaining at least one predetermined template segment and a template tag sequence in the video template; screening at least one video segment matching the template attribute tag of the at least one template segment; splicing the at least one matched video segment according to a position of a template attribute tag of each template segment in the template tag sequence as a video material segment of the target video; and pushing the video data and the video material segment to an application client corresponding to the target user.

15 Claims, 16 Drawing Sheets

(58) Field of Classification Search
CPC ......... H04N 21/2393; H04N 21/25891; H04N 21/44008; H04N 21/44012; H04N 21/4826; H04N 21/485
USPC ........................................................ 386/241
See application file for complete search history.

(56) References Cited

FOREIGN PATENT DOCUMENTS

| | | | | |
|---|---|---|---|---|
| CN | 111105819 A | * | 5/2020 | ........... G11B 27/031 |
| CN | 111105819 A | | 5/2020 | |
| CN | 111866585 A | * | 10/2020 | ............. H04N 21/44 |
| CN | 111866585 A | | 10/2020 | |
| CN | 112565825 A | | 3/2021 | |
| WO | 2018/107914 A1 | | 6/2018 | |

OTHER PUBLICATIONS

English_Translation_of_Chinese_Publication_CN111866585_10-2020 (Year: 2020).*
Chinese Office Action for CN 202011390109.2 dated Dec. 16, 2021.
International Search Report for PCT/CN2021/133035 dated Feb. 18, 2022.
Written Opinion for PCT/CN2021/133035 dated Feb. 18, 2022.

* cited by examiner

VIDEO DATA PROCESSING METHOD AND APPARATUS, DEVICE, AND MEDIUM

CROSS-REFERENCE TO RELATED APPLICATION(S)

This application is a bypass continuation application of International Application No. PCT/CN2021/133035, filed Nov. 25, 2021, which claims priority to Chinese Patent Application No. 202011390109.2, filed on Dec. 2, 2020, the disclosures of which are incorporated herein in their entireties.

FIELD

The disclosure relates to the field of computer technologies, and in particular, to a video data processing method and apparatus, a device, and a medium.

BACKGROUND

With the development of multimedia technologies, videos have become a main carrier for people to obtain information and enjoy entertainment in daily life. With the popularization of various types of video playing platforms, various short videos (e.g., highlight video collections) are derived. It may be understood that the short videos can be played on the various types of video playing platform and are suitable for watching in a user's moving state or in a short-time recreation state.

However, at present, in a process in which a short video is generated, manual material editing, manual video synthesizing, manual background music adding, and audio and video synthesizing are generally required.

SUMMARY

Embodiments of the disclosure provide a video data processing method and apparatus, a device, and a medium, in which generation efficiency of a short video is improved with reduced cost and computing resources.

An aspect of example embodiments of the disclosure provides a video data processing method, including:
  obtaining video data of a target video requested by a target user, and performing video analysis on the video data to obtain a plurality of video segments, the video analysis including storyboard processing and attribute analysis based on a plurality of preset segment attribute tags, and each video segment in the plurality of video segments corresponding to one segment attribute tag and one storyboard segment;
  determining a video template associated with the target user from a video template database based on a user portrait of the target user, and obtaining at least one template segment and a template tag sequence in the video template, the template tag sequence being based on a template attribute tag of the at least one template segment;
  screening at least one video segment matching the template attribute tag of the at least one template segment from the plurality of video segments based on the template attribute tag of the at least one template segment and segment attribute tags corresponding to the plurality of video segments;
  splicing the at least one matched video segment according to a position of a template attribute tag of each template segment in the at least one template segment in the template tag sequence as a video material segment of the target video; and
  pushing the video data and the video material segment to an application client corresponding to the target user, to be output.

An aspect of example embodiments of the disclosure provides a video data processing apparatus, including at least one memory configured to store program code; and at least one processor configured to read the program code and operate as instructed by the program code, the program code including:
  segment generation code configured to cause at least one of the at least one processor to obtain video data of a target video requested by a target user, and perform video analysis on the video data to obtain a plurality of video segments, the video analysis including storyboard processing and attribute analysis based on a plurality of preset segment attribute tags, and each video segment in the plurality of video segments corresponding to one segment attribute tag and one storyboard segment;
  template obtaining code configured to cause at least one of the at least one processor to determine a video template associated with the target user from a video template database based on a user portrait of the target user, and obtain at least one template segment and a template tag sequence in the video template, the template tag sequence being based on a template attribute tag of the at least one template segment;
  material determining code configured to cause at least one of the at least one processor to screen at least one video segment matching the template attribute tag of the at least one template segment from the plurality of video segments based on the template attribute tag of the at least one template segment and segment attribute tags corresponding to the plurality of video segments, and splice the at least one matched video segment according to a position of a template attribute tag of each template segment in the at least one template segment in the template tag sequence as a video material segment of the target video; and
  data transmission code configured to cause at least one of the at least one processor to push the video data and the video material segment to an application client corresponding to the target user, to be output.

An aspect of example embodiments of the disclosure provides a video data processing method, including:
  obtaining, in response to a play operation performed by a target user on a target video in an application client, video data of the target video and a video material segment associated with the target video from a server, where the video material segment is a plurality of video segments obtained by video analysis performed by the server on the video data, the video analysis includes storyboard processing and attribute analysis based on a plurality of preset segment attribute tags, and each video segment in the plurality of video segments corresponds to one segment attribute tag and one storyboard segment (that is, each video segment is one storyboard segment corresponding to one segment attribute tag); a video template associated with the target user is determined from a video template database based on a user portrait of the target user, and at least one template segment and a template tag sequence in the video template are obtained, where the template tag sequence is formed by a template attribute tag of the at least one template segment; at least one video segment matching the template attribute tag of the at least one template segment is screened (or selected) from the plurality of video segments based on the template attribute tag of the at least one template segment and segment attribute tags corresponding to the plurality of video segments; and the video material segment is obtained by splicing the at least one matched video segment according to a position of a template attribute tag of each template segment in the at least one template segment in the template tag sequence; and outputting the video data and the video material segment in an application display interface of the application client.

An aspect of example embodiments of the disclosure provides a video data processing apparatus, including at least one memory configured to store program code; and at least one processor configured to read the program code and operate as instructed by the program code, the program code including:

data obtaining code configured to cause at least one of the at least one processor to obtain, in response to a play operation performed by a target user on a target video in an application client, video data of the target video and a video material segment associated with the target video from a server, where the video material segment is a plurality of video segments obtained by video analysis performed by the server on the video data, the video analysis includes storyboard processing and attribute analysis based on a plurality of preset segment attribute tags, and each video segment in the plurality of video segments corresponds to one segment attribute tag and one storyboard segment; a video template associated with the target user is determined from a video template database based on a user portrait of the target user, and at least one template segment and a template tag sequence in the video template are obtained, where the template tag sequence is formed by a template attribute tag of the at least one template segment; at least one video segment matching the template attribute tag of the at least one template segment is screened from the plurality of video segments based on the template attribute tag of the at least one template segment and segment attribute tags corresponding to the plurality of video segments; and the video material segment is obtained by splicing the at least one matched video segment according to a position of a template attribute tag of each template segment in the at least one template segment in the template tag sequence; and data output code configured to cause at least one of the at least one processor to output the video data and the video material segment in an application display interface of the application client.

An aspect of example embodiments of the disclosure provides a computer device, including a memory and a processor, the memory storing a computer program, the computer program, when executed by the processor, causing the processor to perform the method according to the embodiments of the disclosure.

An aspect of example embodiments of the disclosure provides a computer-readable storage medium, storing a computer program, the computer program including program instructions, the program instructions, when executed by a processor, performing the method according to the embodiments of the disclosure.

An aspect of example embodiments of the disclosure provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the method according to the embodiments of the disclosure.

BRIEF DESCRIPTION OF THE DRAWINGS

To describe the technical solutions of example embodiments of the disclosure or the related art more clearly, the accompanying drawings for describing the embodiments or the related art are briefly introduced below. The accompanying drawings in the following description show merely some embodiments of the disclosure, and a person of ordinary skill in the art may still derive other accompanying drawings from these accompanying drawings without creative efforts.

DETAILED DESCRIPTION

The technical solutions in the embodiments of the disclosure are clearly and completely described in the following with reference to the accompanying drawings in the embodiments of the disclosure. The described embodiments are merely some embodiments of the disclosure rather than all of the embodiments. All other embodiments obtained by a person of ordinary skill in the art based on the embodiments of the disclosure without creative efforts shall fall within the protection scope of the disclosure.

It is to be understood that, artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that may react in a manner similar to human intelligence. AI is to study the design principles and implementation methods of various intelligent machines, to enable the machines to have the functions of perception, reasoning, and decision-making.

An AI technology is a comprehensive discipline, and relates to a wide range of fields including both hardware-level technologies and software-level technologies. AI foundational technologies generally include technologies such as a sensor, a dedicated AI chip, cloud computing, distributed storage, a big data processing technology, an operating/interaction system, and electromechanical integration. An AI software technology mainly includes fields such as a computer vision (CV) technology, a speech processing technology, a natural language processing technology, and machine learning/deep learning.

The CV is a science that studies how to use a machine to "see", and furthermore, refers to using a camera and a computer to replace human eyes for performing machine vision, such as recognition, tracking, and measurement, on a target, and further perform graphic processing, so that the computer processes the target into an image more suitable for human eyes to observe, or an image transmitted to an instrument for detection. As a scientific subject, the CV studies related theories and technologies, and attempts to establish an AI system that may obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Figure 1:
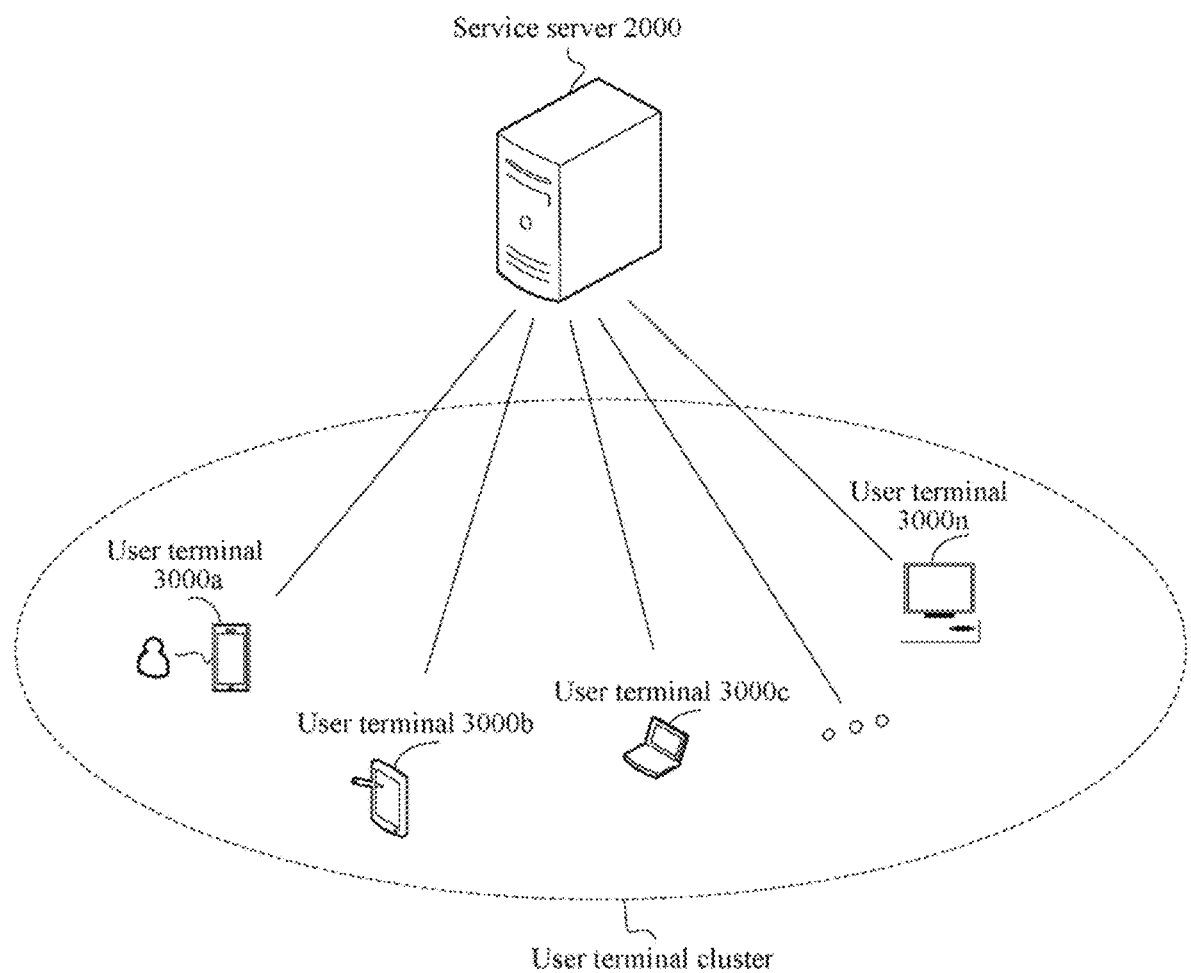
FIG. 1 is a schematic structural diagram of a network architecture according to an embodiment of the disclosure.

FIG. 1 is a schematic structural diagram of a network architecture according to an embodiment of the disclosure. As shown in FIG. 1, the network architecture may include a service server 2000 and a user terminal cluster. The user terminal cluster may specifically include one or a plurality of user terminals, and the number of user terminals in the user terminal cluster is not limited herein. As shown in FIG. 1, the plurality of user terminals may specifically include a user terminal 3000a, a user terminal 3000b, a user terminal 3000c, . . . , and a user terminal 3000n. The user terminal 3000a, the user terminal 3000b, the user terminal 3000c, and the user terminal 3000n may respectively establish a direct or indirect network connection to the service server 2000 in a wired or wireless communication manner, so that each user terminal may exchange data with the service server 2000 through the network connection.

The service server 2000 shown in FIG. 1 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an AI platform.

It is to be understood that, each user terminal in the user terminal cluster shown in FIG. 1 may be installed with an application client in an integrated manner. When running in the user terminals, the application client may exchange data with the service server 2000 shown in FIG. 1 respectively. The application client may be understood as an application that may load and display video data. For example, the application client herein may specifically include: an in-vehicle client, a smart household client, an entertainment client (for example, a game client), a multimedia client (for example, a video client), a social client, and an information client (for example, a news client). For ease of understanding, in this embodiment of the disclosure, one user terminal may be selected from the plurality of user terminals shown in FIG. 1 as a target user terminal, and the target user terminal may include a smart terminal that includes a video data loading function such as a smartphone, a tablet computer, a notebook computer, or a smart television. For example, in this embodiment of the disclosure, the user terminal 3000a shown in FIG. 1 may be used as the target user terminal.

For ease of understanding, for example, when a user Y (namely, a target user) needs to play a video (for example, a video in which the user Y is interested) in the target user terminal, the target user terminal may respond to a trigger operation of the user Y on the video and transmit a video playing request to the service server 2000 shown in FIG. 1. In this way, the service server 2000 may find video data of the video in a video service database based on the video playing request, and return the video data and one or a plurality of video material segments (for example, video titbits of the video) associated with the video data to the target user terminal, so that the video data of the video that the user Y requests to play is played in the target user terminal. In an implementation, the target user terminal may further display the received video material segments while playing the video data. It may be understood that the video material segment herein may be obtained by the service server 2000 by screening video segments of a target video according to template segments of a selected video template and a template tag sequence corresponding to the template segments. In addition, it may be understood that, the video segments may be obtained by the service server 2000 by performing video analysis on the video data. It is to be understood that, the video template may be determined by the service server 2000 based on a user portrait of the user Y (namely, the target user).

It may be understood that, in this embodiment of the disclosure, videos (for example, television dramas or short videos) in which the user Y (namely, the target user) is interested and selected in the application client (for example, a video client K) are collectively referred to as a target video.

The video material segment in this embodiment of the disclosure may be intelligently generated by the service server 2000 according to the template segments of the video template and the template tag sequence. For example, the service server 2000 may intelligently generate one or a plurality of video material segments of the target video (for example, a television drama S1) selected by the user Y in the target user terminal according to a video data processing method according to an embodiment of the disclosure. A generation process of the video material segment may include a process in which the service server 2000 may perform tag matching and content similarity matching between tag information (namely, a segment attribute tag) of video segments of the television drama S1 and tag information (namely, a template attribute tag) of template segments of a template video (for example, a video M). Further, video segments having a video playing effect similar to each template segment in the template segments of the video M may be screened from the video segments of the television drama S1 according to results of the tag matching and the content similarity matching, and a video material segment similar to the video M may be intelligently generated according to spliced video data formed by the screened video segments and template audio data of the template segments.

It is to be understood that, the network architecture is suitable for an artificial intelligence field (namely, an AI field), service scenarios corresponding to the AI field may be a video classification scenario or a video recommendation scenario, and specific service scenarios are not listed one by one herein.

The video classification scenario herein mainly refers to a scenario in which a computer device (for example, the service server 2000) may store video segments of the same video into a first service database according to the foregoing video data processing method. For example, after the computer device generates video material segments based on a video template (for example, a video material segment A1 generated based on a video template B1 and a video material segment A2 generated based on a video template B2), the video material segment A1 and the video material segment A2 may be added to a corresponding short video recommendation database, and the short video recommendation database may include at least the first service database and a second service database. The first service database herein may be configured to store one or a plurality of video material segments associated with the same video. For example, if the video material segment A1 and the video material segment A2 are video segments belonging to the same video (for example, a video W), the video material segment A1 and the video material segment A2 may be added to a first service database corresponding to the video W. In an implementation, if the video material segment A1 and the video material segment A2 are video segments respectively belonging to different videos, for example, if a target video corresponding to the video material segment A1 is a video W1 requested by a user Y1, the video material segment A1 may be added to a first service database corresponding to the video W1; and if a target video corresponding to the video material segment A2 is a video W2 requested by a user Y2, the video material segment A2 may be added to a first service database corresponding to the video W2.

The second service database herein may be configured to store one or a plurality of video material segments associated with the same video template. This means that in this embodiment of the disclosure, video segments using the same video template in video material segments of different videos may be added to the second service database. For example, after the computer device generates a video material segment based on a video template (for example, generates a video material segment A based on a video template B), the video material segment A may be added to a second service database corresponding to the video template B. For ease of understanding, for example, if the video template B is an expression collection type, the video material segment A may be added to a second service database corresponding to the expression collection type. In another example, if the video template B is a story plot collection type, the video material segment A may be added to a second service database corresponding to the story plot collection type. In still another example, if the video template B is a character mashup collection type, the video material segment A may be added to a second service database corresponding to the character mashup collection type.

In addition, it is to be understood that, in the foregoing video recommendation scenario, after the computer device (for example, the service server 2000) intelligently generates the video material segments (for example, the video material segment A1 generated based on the video template B1 and the video material segment A2 generated based on the video template B2) of the target video requested by the target user according to the foregoing video data processing method, the video segments of the same video W (namely, the video segments in the first service database, such as the video material segment A1 and the video material segment A2) may be added to a short video recommendation list (for example, a short video recommendation list 1), to intelligently push the video segments in the short video recommendation list 1 to the target user. In this way, after the target user completes watching of the video W (namely, the target video) in the application client, the video segments in the short video recommendation list 1 may be intelligently played for the target user in a traversing manner in the application client. For example, when the target user completes watching of the video W in the target user terminal, the computer device (for example, the service server 2000) may output the video material segment A1 in the plurality of video material segments in the short video recommendation list 1 to the application client, so as to intelligently play the video material segment A1 in the application client. It may be understood that, the video material segment A1 has a video playing effect similar to a template segment mapped by the video template B1.

In an implementation, after the computer device (for example, the service server 2000) intelligently generates the video material segments (for example, the video material segment A1 and a video material segment A3 generated based on the video template B1) according to the foregoing video data processing method, the video segments using the same video template B1 (namely, the video segments in the second service database, such as the video material segment A1 and the video material segment A3) may be added to another short video recommendation list (for example, a short video recommendation list 2), to intelligently push the video segments in the short video recommendation list 2 to the target user. In this way, after the target user completes watching of the video segments in the short video recommendation list 1 (for example, the video material segment A1) in the application client, the video segments in the short video recommendation list 2 may be intelligently played for the target user in a traversing manner in the application client. For example, when the target user completes watching of the video material segment A1 in the target user terminal, the computer device (for example, the service server 2000) may output other video material segments (for example, the video material segment A3) in the short video recommendation list 2 to the application client, so as to intelligently play the video material segment A3 in the application client. It may be understood that, the video material segment A3 and the video template B1 use the same video template, so that when the video material segment A3 and the video template B1 are played in the application client, a video playing effect similar to the template segment mapped by the video template B1 is presented for the target user.

Figure 2:
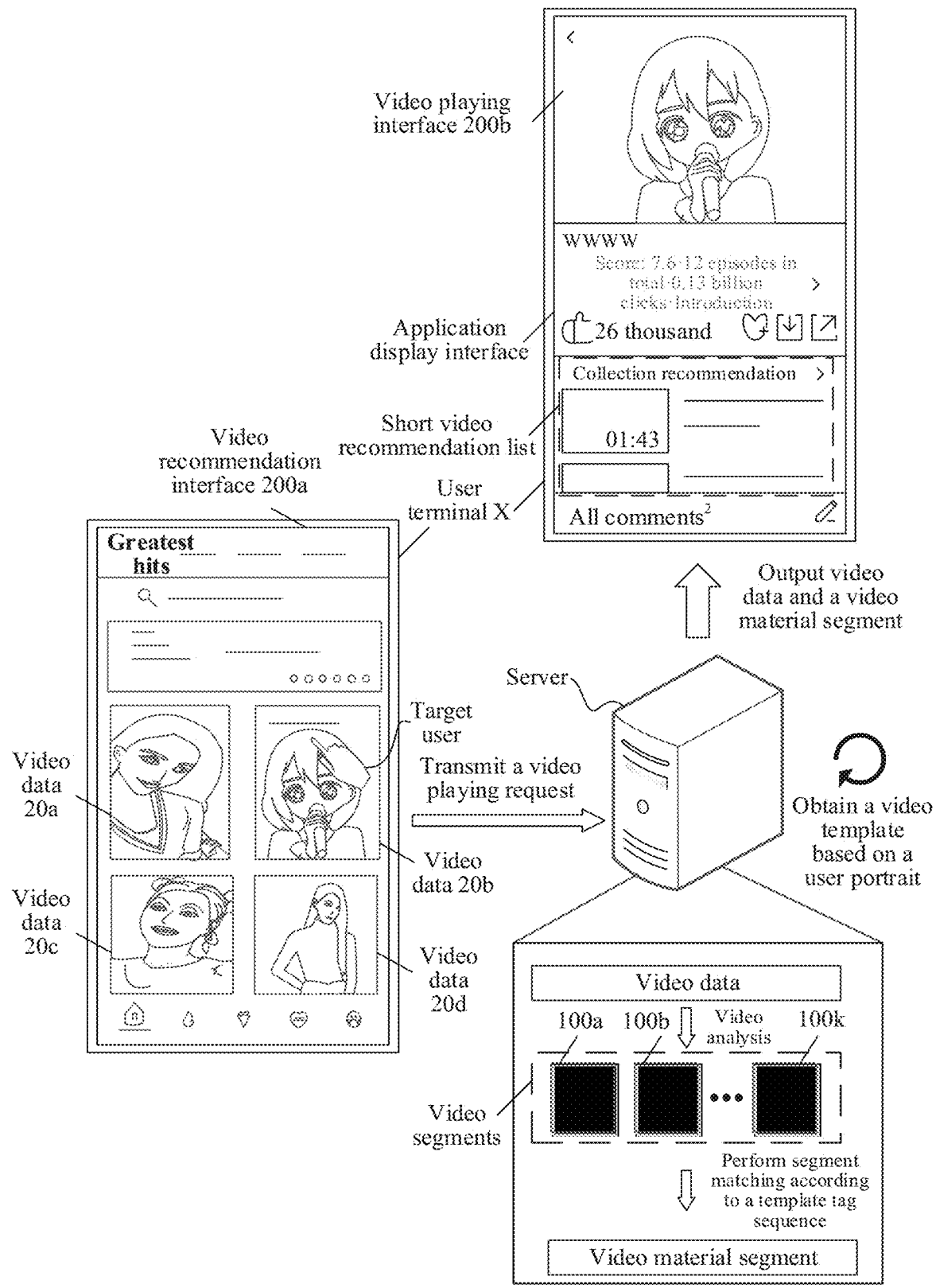
FIG. 2 is a schematic diagram of a scenario of performing data exchange according to an embodiment of the disclosure.

For ease of understanding, FIG. 2 is a schematic diagram of a scenario of performing data exchange according to an embodiment of the disclosure. A server shown in FIG. 2 may be the service server 2000 in the embodiment corresponding to FIG. 1, and a user terminal X shown in FIG. 2 may be any user terminal in the user terminal cluster in the embodiment corresponding to FIG. 1. For ease of understanding, in this embodiment of the disclosure, an example in which the user terminal 3000a shown in FIG. 1 is used as the user terminal X is used to describe an illustrative process of recommending a video material segment for the target user when the service scenario is a video recommendation scenario.

As shown in FIG. 2, a video recommendation interface 200a may include a plurality of pieces of recommended video data, and the plurality of pieces of recommended video data herein may specifically include video data 20a, video data 20b, video data 20c, and video data 20d shown in FIG. 2. It may be understood that, in this embodiment of the disclosure, the video data 20a, the video data 20b, the video data 20c, and the video data 20d displayed in the video recommendation interface 200a may be collectively referred to as recommended video data.

As shown in FIG. 2, when the target user selects to play one piece of recommended video data (for example, the video data 20b), the video data 20b selected by the target user in the video recommendation interface 200a may be collectively referred to as a target video in an application display interface. In this case, the user terminal may respond to a play operation on the target video in the application display interface and transmit a video playing request to the server shown in FIG. 2. In this case, the server may respond to the video playing request to output a video playing interface corresponding to the target video in the application client, for example, may output a video playing interface corresponding to the video data 20b in the application client, and the video playing interface corresponding to the video data 20b may be the video playing interface 200b shown in FIG. 2. The application display interface may include the video playing interface 200b used for playing the target video, and may further include a short video recommendation list used for displaying video material segments, where the short video recommendation list may include video material segments associated with the target video.

It may be understood that, when the server receives the video playing request transmitted by the target user through the user terminal, a video identifier of the target video may be obtained from the video playing request, and the video data of the target video may be queried from the video service database according to the video identifier. After the video data of the target video is queried, the server may perform the foregoing video analysis on a video sequence of the video data, to obtain video segments of the video data. The video segments herein may specifically include a video segment 100a, a video segment 100b, . . . , and a video segment 100k shown in FIG. 2, and each video segment herein may correspond to one segment attribute tag.

Further, the server may obtain a video template fitting a watching interest of the target user based on the user portrait of the target user, and may further obtain template segments mapped by the video template and a template tag sequence corresponding to the template segments, so that a video segment matching each template segment (namely, a video segment meeting a segment matching condition) may be screened from the video segments according to the template tag sequence, and a video material segment may be further obtained based on the screened video segments that meet the segment matching condition. As can be seen, in this embodiment of the disclosure, video segments having the same tag sequence feature as the template segments are obtained from the video segments as many as possible, and the video material segment (for example, one or more short videos of the target video) may be obtained through filling according to a same tag sequence (namely, the foregoing template tag sequence), so that the user terminal may output the video material segment and the video data to the application client. It may be understood that, one video template may correspond to one or more video material segments, and the number of the video material segments having the same tag sequence feature screened from the video segments of the target video is not limited herein.

For ease of understanding, in this embodiment of the disclosure, one video template corresponds to one video material segment. When the server determines that a plurality of (for example, N) video templates fitting the watching interest of the target user, N video templates used for intelligently generating N video material segments may be collectively referred to as a video template in this embodiment of the disclosure. It is to be understood that, for an example implementation of intelligently generating another video material segment according to the N video templates, reference may be made to the foregoing description of an example process of intelligently generating the video material segment, and details are not described herein again.

For an example implementation of recommending the video material segment in the target user terminal, reference may be made to the following embodiments corresponding to FIG. 3 to FIG. 12B.

Figure 3:
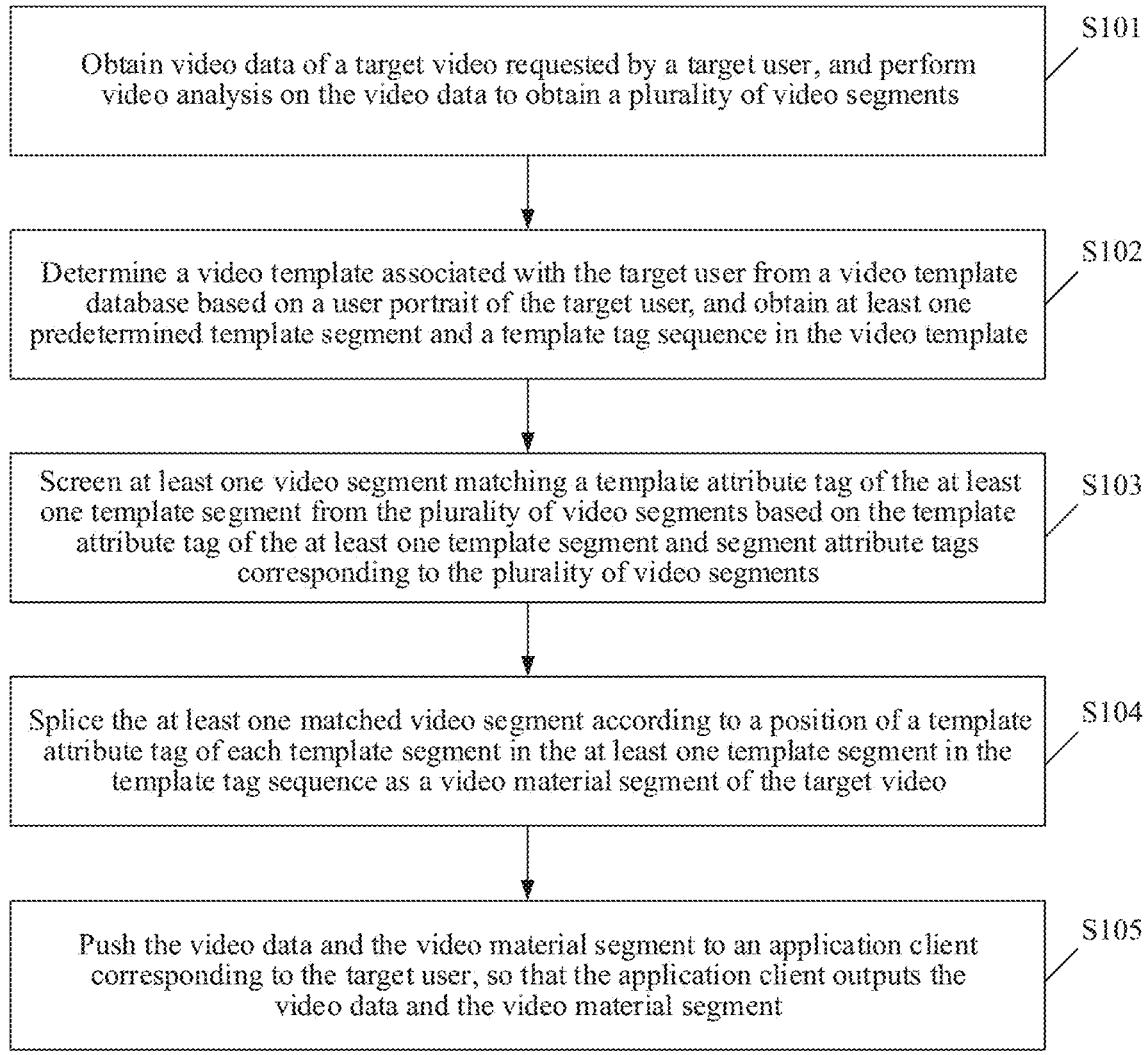
FIG. 3 is a schematic flowchart of a video data processing method according to an embodiment of the disclosure.

FIG. 3 is a schematic flowchart of a video data processing method according to an embodiment of the disclosure. As shown in FIG. 3, the method may be performed by an application client, or may be performed by a server, or may be performed by an application client and a server together. The application client may be the application client run in the user terminal X in the embodiment corresponding to FIG. 2, and the server may be the server in the embodiment corresponding to FIG. 2. For ease of understanding, in this embodiment, an illustrative process in which a video material segment corresponding to a target video is generated in the server based on a video template is described by using an example in which the method is performed by the server. The method may at least include the following step S101 to step S105:

Step S101: Obtain video data of a target video requested by a target user, and perform video analysis on the video data to obtain a plurality of video segments, the video analysis including storyboard processing and attribute analysis based on a plurality of preset segment attribute tags, and each video segment in the plurality of video segments corresponding to one segment attribute tag and one storyboard segment.

Specifically, the server may obtain the video data of the target video requested by the target user and a network recognition model associated with the video data. Further, the server may perform storyboard processing on a video sequence corresponding to the video data through a video partitioning component, to obtain a plurality of storyboard segments associated with the video sequence. Further, the server may input the plurality of storyboard segments into the network recognition model, and perform attribute analysis on the plurality of storyboard segments through the network recognition model based on the plurality of preset segment attribute tags, to obtain segment attribute tags corresponding to the plurality of storyboard segments. Further, the server may determine the plurality of storyboard segments including the segment attribute tags as the plurality of video segments of the video data. One video segment may correspond to one segment attribute tag.

It is to be understood that, before the video data of the target video requested by the target user is obtained, the server may receive a video playing request transmitted by the application client. The video playing request is generated by the application client in response to a play operation performed by the target user on the target video. Further, the server may extract a video identifier of the target video from the video playing request, search for service video data corresponding to the target video in a video service database based on the video identifier, and use the searched service video data as the video data of the target video in the application client.

Figure 4:
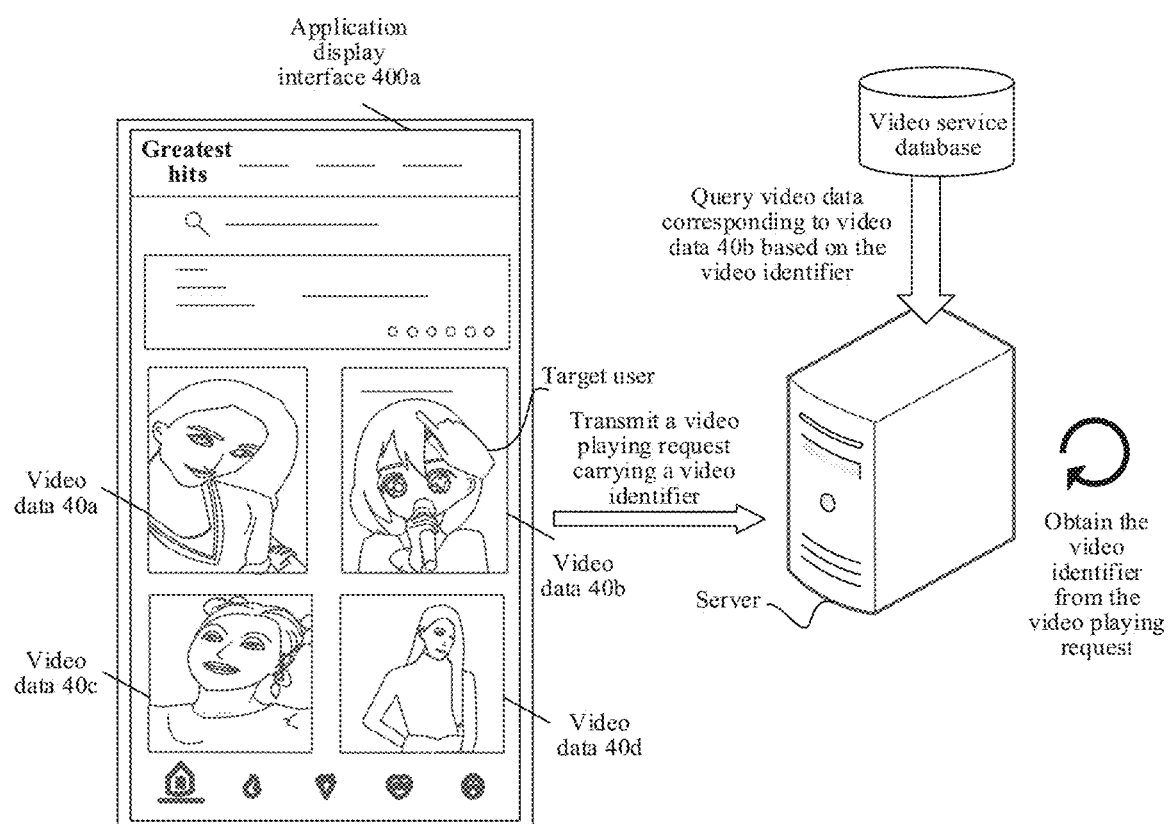
FIG. 4 is a schematic diagram of a scenario of querying video data according to an embodiment of the disclosure.

For ease of understanding, FIG. 4 is a schematic diagram of a scenario of querying video data according to an embodiment of the disclosure. As shown in FIG. 4, an application display interface 400a may be the application display interface 200a in the embodiment corresponding to FIG. 2. When the target user performs a trigger operation (namely, a play operation) on video data 40b in the application display interface 400a of the application client, the application client may use the video data 40b as a target video and transmit a video playing request carrying a video identifier of the video data 40b to the server. Further, the server may receive the video playing request transmitted by the application client, obtain the video identifier of the video data 40b carried in the video playing request, search for service video data corresponding to the video identifier in a video service database corresponding to the application client based on the video identifier, and use the searched service video data as video data corresponding to the video data 40b.

It may be understood that, the target video may be a long video such as a variety show, a movie, or a television drama, or may be a short video captured from a long video, which is not limited herein.

It is to be understood that, an example process in which the server performs storyboard processing on the video sequence corresponding to the video data through the video partitioning component, to obtain the plurality of storyboard segments associated with the video sequence may be described as follows: the server may determine a first video frame serving as a cluster centroid in the video sequence through a video partitioning component while obtaining the video partitioning component configured to perform storyboard processing on the video sequence of the video data, and create storyboard cluster information of a storyboard cluster to which the first video frame belongs (it may be understood that, the storyboard cluster information may be a configured identifier of a corresponding storyboard cluster). Further, the server may determine video frames other than the first video frame in the video sequence as second video frames, and obtain each second video frame in the second video frames sequentially based on a pooling mechanism, to determine an image similarity between each second video frame and the first video frame. Further, in a case that the image similarity between the first video frame and a second video frame is greater than or equal to a clustering threshold, the server may divide the second video frame whose image similarity is greater than or equal to the clustering threshold to the storyboard cluster to which the first video frame belongs. Further, in a case that the image similarity between the first video frame and a second video frame is less than the clustering threshold, the server may update the first video frame using the second video frame whose image similarity is less than the clustering threshold (for example, use the second video frame as the updated first video frame); create storyboard cluster information of another storyboard cluster to which the updated first video frame belongs; and sequentially perform image similarity matching between the updated first video frame and second video frames that were not previously matched until image similarity matching is performed on each video frame in the video sequence, so that storyboard cluster information of a storyboard cluster to which each video frame in the video sequence belongs may be obtained (namely, a storyboard cluster to which each video frame in the video sequence belongs may be obtained through division). Further, the server may determine storyboard segments associated with the video sequence based on the storyboard cluster information of the storyboard cluster to which each video frame in the video sequence belongs, namely, form each video frame in the video sequence into the plurality of storyboard segments.

It may be understood that, the image similarity matching refers to calculating a degree of similarity between content of two images to obtain an image similarity used for determining the degree of similarity between the content of the images. A greater image similarity indicates a higher degree of similarity between the two images, and a smaller image similarity indicates a lower degree of similarity between the two images. The degree of similarity between the content of the two images may be measured in different manners. For example, in a case that a cosine similarity is adopted, an image may be represented as a vector, and the similarity between the two images is represented by calculating a cosine distance between vectors. A histogram may describe global distribution of colors in an image, and a histogram similarity is another method for calculating a similarity between images. A structure similarity is a full-reference image quality evaluation indicator, which measures an image similarity in terms of brightness, contrast, and structure. It is to be understood that, a specific method used for performing image similarity matching is not limited in the disclosure.

Figure 5:
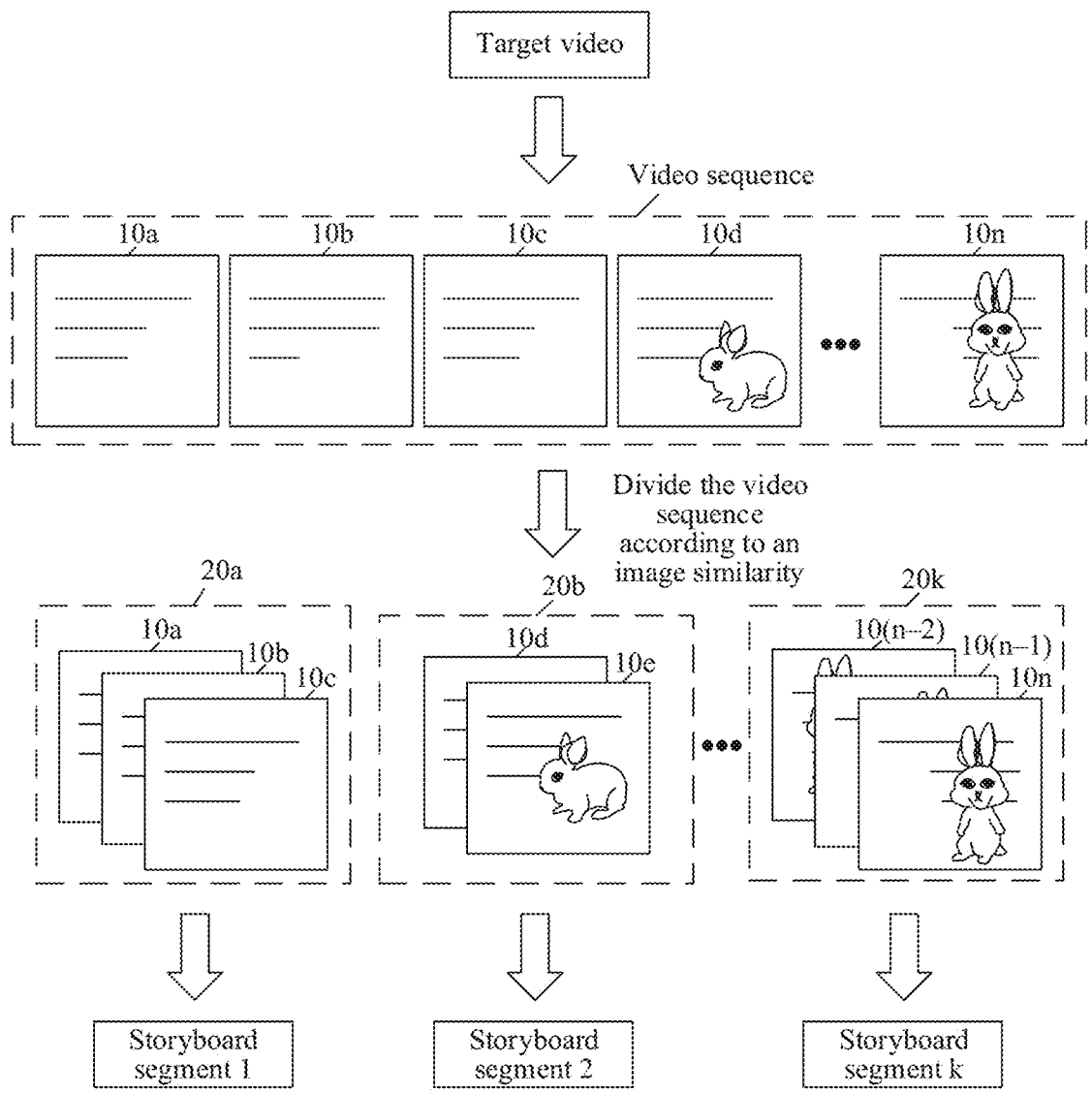
FIG. 5 is a schematic diagram of a scenario of performing storyboard processing according to an embodiment of the disclosure.

For ease of understanding, FIG. 5 is a schematic diagram of a scenario of performing storyboard processing according to an embodiment of the disclosure. The video sequence shown in FIG. 5 may include a plurality of video frames, and may include n video frames shown in FIG. 2, where n may be a positive integer greater than 1, and the n video frames may include: a video frame 10a, a video frame 10b, a video frame 10c, a video frame 10d, and a video frame 10n. It is to be understood that, the image similarity between the video frames in the video sequence may be calculated through a clustering algorithm, so that the video frames in the video sequence may be divided to different clustering clusters (namely, storyboard clusters) according to the calculated image similarity between the video frames. For example, k clustering clusters (namely, k storyboard clusters) shown in FIG. 5 may be obtained through a clustering algorithm, and the k clustering clusters may specifically include a clustering cluster 20a, a clustering cluster 20b, . . . , and a clustering cluster 20k shown in FIG. 5. It may be understood that, each clustering cluster in the k clustering clusters shown in FIG. 5 may include at least one video frame.

In an embodiment of the disclosure, in the video sequence shown in FIG. 5, a first video frame (namely, the video frame 10a) in the video sequence may be referred to as the first video frame serving as a cluster centroid (namely, a cluster centroid 1), and other video frames other than the video frame 10a in the video sequence are determined as second video frames, and the second video frames (namely, the video frame 10b, the video frame 10c, . . . , and the video frame 10n) may be sequentially obtained based on a polling mechanism, to sequentially calculate the image similarity between the first video frame and each of the second video frames. In the disclosure, a storyboard cluster (namely, a storyboard cluster 1) to which the cluster centroid 1 belongs may be created, and image similarity matching may be performed on the video frame 10b and the video frame 10a. In a case that an image similarity (for example, a similarity 1) between the video frame 10b and the video frame 10a is greater than or equal to a clustering threshold, the video frame 10b corresponding to the similarity 1 is divided (or allocated) to the storyboard cluster (namely, the storyboard cluster 1) to which the video frame 10a belongs. Similarly, in the disclosure, the video frame 10c may be divided to the storyboard cluster (namely, the storyboard cluster 1) to which the video frame 10a belongs.

Further, because the video frame 10d is a next video frame of the video frame 10c, in the disclosure, image similarity matching may be performed on the video frame 10d and the video frame 10a. In a case that the image similarity (namely, a similarity 2) between the video frame 10d and the video frame 10a is less than the clustering threshold, the first video frame is updated according to the video frame 10d, the video frame 10d corresponding to the similarity 2 may be used as the updated first video frame and a new cluster centroid (namely, a cluster centroid 2), a storyboard cluster (namely, a storyboard cluster 2) to which the cluster centroid 2 belongs may be created, and second video frames (namely, a video frame 10e, . . . , and the video frame 10n) that have not been matched may be sequentially obtained based on the polling mechanism, to sequentially calculate an image similarity between the updated first video frame and each of the second video frames that have not been matched. In the disclosure, the video frame 10e may be divided (or allocated0 to the storyboard cluster (namely, the storyboard cluster 2) to which the video frame 10d belongs.

It may be understood that, in the disclosure, after the cluster centroid 1 and the cluster centroid 2 are obtained, a cluster centroid 3, a cluster centroid 4, . . . , and a cluster centroid k may be obtained in the same manner. Similarly, in the disclosure, after the storyboard cluster 1 (namely, the clustering cluster 20a) and the storyboard cluster 2 (namely, the clustering cluster 20b) are obtained, a storyboard cluster 3 (namely, the clustering cluster 20c), a storyboard cluster 4 (namely, the clustering cluster 20d), and a storyboard cluster k (namely, the clustering cluster 20k) may be obtained in the same manner. In this manner, image similarity matching on the video frame 10a, the video frame 10b, . . . , and the video frame 10n in the video sequence has been all completed.

As can be seen, by performing clustering processing (namely, storyboard processing) on the video frames in the video sequence shown in FIG. 5, a plurality of clustering clusters (namely, storyboard clusters) associated with the video sequence may be obtained, and the video frames in each clustering cluster may form a storyboard segment, so as to obtain the k storyboard segments shown in FIG. 5. For example, the video frame 10a, the video frame 10b, and the video frame 10c in the clustering cluster 20a may form a storyboard segment (namely, a storyboard segment 1) corresponding to the storyboard cluster 1, the video frame 10d and the video frame 10e in the clustering cluster 20b may form a storyboard segment (namely, a storyboard segment 2) corresponding to the storyboard cluster 2, . . . , and a video frame 10(n-2), a video frame 10(n-1), and the video frame 10n in the clustering cluster 20k may form a storyboard segment (namely, a storyboard segment k) corresponding to the storyboard cluster k.

It is to be understood that, the video partitioning component dividing the video sequence corresponding to the target video into a plurality of storyboard segments may be a pyscenedetect open source code base, and the pyscenedetect open source code base is a tool that automatically segment video data into single segments, where selection of the first video frame (namely, a cluster centroid) may not be limited to the foregoing manner. It may be understood that, the method for dividing the video sequence corresponding to the target video into a plurality of storyboard segments may be a drumbeat recognition manner. For example, audio data of the target video is obtained, drumbeats in the audio data are recognized, and a position of each of the drumbeats in the video data of the target video is determined according to a position of each of the drumbeats in the audio data, so as to divide the video sequence of the video data. The method for dividing the video sequence into a plurality of storyboard segments may alternatively be another method, and a specific storyboarding method used for video storyboard is not limited in the disclosure.

It may be understood that, the network recognition model includes at least a first network model including a first attribute tag extraction function, a second network model including a second attribute tag extraction function, and a third network model including a third attribute tag extraction function. It is to be understood that, the server may input the plurality of storyboard segments into the first network model, perform long shot and close shot analysis on each storyboard segment in the plurality of storyboard segments through the first network model to obtain long shot and close shot tags of the plurality of storyboard segments, use the long shot and close shot tags of the plurality of storyboard segments as a first attribute tag outputted by the first network model, and use storyboard segments including the first attribute tag as storyboard segments of a first type. Further, the server may input the storyboard segments of the first type into the second network model, and perform face detection on each storyboard segment in the storyboard segments of the first type through the second network model to obtain a face detection result. Further, in a case that the face detection result indicates that a face of a target character exists in the storyboard segments of the first type, the server may use storyboard segments corresponding to the face of the target character existing in the storyboard segments of the first type as storyboard segments of a second type; determine a character tag to which the target character in the storyboard segments of the second type belongs through the second network model; and determine the character tag to which the target character belongs as a second attribute tag of the storyboard segments of the second type, where the target character is one or more characters in the target video. Further, the server may determine storyboard segments other than the storyboard segments of the second type in the storyboard segments of the first type as storyboard segments of a third type, input the storyboard segments of the third type into the third network model, and perform scene detection on each storyboard segment in the storyboard segments of the first type through the third network model to obtain a third attribute tag of the storyboard segments of the third type. Further, the server may determine a segment attribute tag corresponding to each storyboard segment in the plurality of storyboard segments according to the first attribute tag of the storyboard segments of the first type, the second attribute tag of the storyboard segments of the second type, and the third attribute tag of the storyboard segments of the third type.

It may be understood that, the first network model may be a long shot and close shot recognition model, the second network model may be a face recognition model, and the third network model may be a scene recognition model. Based on this, the first network model, the second network model, and third network model may also be an expression recognition model or an action recognition model, and a specific type of the network recognition model is not limited in the disclosure. Similarly, the network recognition model may adopt any deep learning model or machine learning model, and a specific model used as the network recognition model is not limited in the disclosure. It is to be understood that, a basic analysis capability on the target video may be improved by using a pre-trained network recognition model, and the video segments corresponding to the target video may be obtained quickly.

It may be understood that, face detection may be performed on the storyboard segments through a face detection model to obtain a face detection result, and a character tag corresponding to a face in the face detection result may be determined through a face recognition model. The face detection model and the face recognition model herein may be collectively referred to as the second network model. Face detection and face recognition may be collectively referred to as image detection. Image detection indicates that a machine learning technology may learn annotated sample data (for example, a correspondence between a plurality of annotation box and tag pairs in an image) to obtain a mathematical model; parameters of the mathematical model may be obtained in a learning and training process; the parameters of the mathematical model are loaded during recognition prediction; a prediction box of a physical tag of an inputted sample existence and a probability that the prediction box belongs to a physical tag within a specified range may be calculated; and a physical tag having a greatest probability may be used as a tag corresponding to the prediction box.

It may be understood that, by directly inputting the storyboard segments into the long shot and close shot recognition model, long shot and close shot tags (namely, the first attribute tag) corresponding to the storyboard segments may be obtained, and by directly inputting the storyboard segments into the scene recognition model, scene tags (namely, the third attribute tag) corresponding to the storyboard segments may be obtained. Before the storyboard segments are inputted into the third network model, target character retrieval need to be performed on a face in advance, namely, the target character of the storyboard segments may be inputted into the second network model in advance, and a feature vector of the target character is extracted through the second network model. Therefore, when the character tag of the storyboard segments is determined, all video frames in the storyboard segments may be extracted when the storyboard segments are inputted into the second network model, face detection is performed on all the video frames, and a feature vector of a detected face may be compared with the feature vector of the target character. If a similarity result of feature vector comparison is greater than a threshold, it is considered that the face is the target character, and a character tag of the target character is used as the character tag (namely, the second attribute tag) of the storyboard segments in which the detected face is located.

It is to be understood that, in the disclosure, with the assistance of the foregoing network recognition model (namely, the first network model, the second network model, and the third network model), the storyboard segments may be directly inputted into the first network model (namely, the foregoing long shot and close shot recognition model) without a need to know the tag information of the storyboard segments (namely, no image noise information needs to be known in advance), to obtain the first attribute tag corresponding to the storyboard segments (namely, sample noise degree prediction is automatically performed according to a model to provide a new tag of each storyboard segment), and storyboard segments having the first attribute tag may be collectively referred to as the storyboard segments of the first type. It may be understood that, in this embodiment of the disclosure, after the storyboard segments of the first type are obtained, the new tag may be automatically fed back to a subsequent model for learning, to prevent partial optimization of the network recognition model through dynamic noise prediction and processing, thereby ensuring that model learning is performed toward a better recognition effect. In addition, the storyboard segments of the first type obtained after long shot and close shot recognition is performed on the storyboard segments of the target video through the first network model may also be used repeatedly when a new video template is used, and recognition and processing on video frames do not need to be performed repeatedly, thereby saving computing resources.

For example, in this embodiment of the disclosure, the storyboard segments of the first type may be inputted into the second network model, so that the second network model may perform face detection and face recognition on each storyboard segment in the storyboard segments of the first type, and may select all storyboard segments of the first type including the face of the target character from the storyboard segments of the first type. It may be understood that, in this embodiment of the disclosure, all the selected storyboard segments of the first type including the face of the target character are collectively referred to as storyboard segments of a second type. In addition, it may be understood that, the second network model may be further configured to output a character tag to which the target character in each of the storyboard segments of the second type belongs. Based on this, in this embodiment of the disclosure, the character tag to which the target character belongs may be collectively referred to as the second attribute tag of the storyboard segments of the second type. It is to be understood that, the target character may be one or more characters in the target video, and the number of the target characters is not limited herein. Further, in this embodiment of the disclosure, other storyboard segments other than the storyboard segments of the second type in the storyboard segments of the first type may be collectively referred to as storyboard segments of a third type, and the storyboard segments of the third type may be inputted into the third network model (namely, the scene recognition model) to obtain the third attribute tag corresponding to the storyboard segments of the third type. As can be seen, in this embodiment of the disclosure, the tag information to which the storyboard segments belong may be corrected in real time through the trained network recognition model, and the segment attribute tag of each storyboard segment may be accurately obtained according to the first attribute tag, the second attribute tag, and the third attribute tag.

Figure 6:
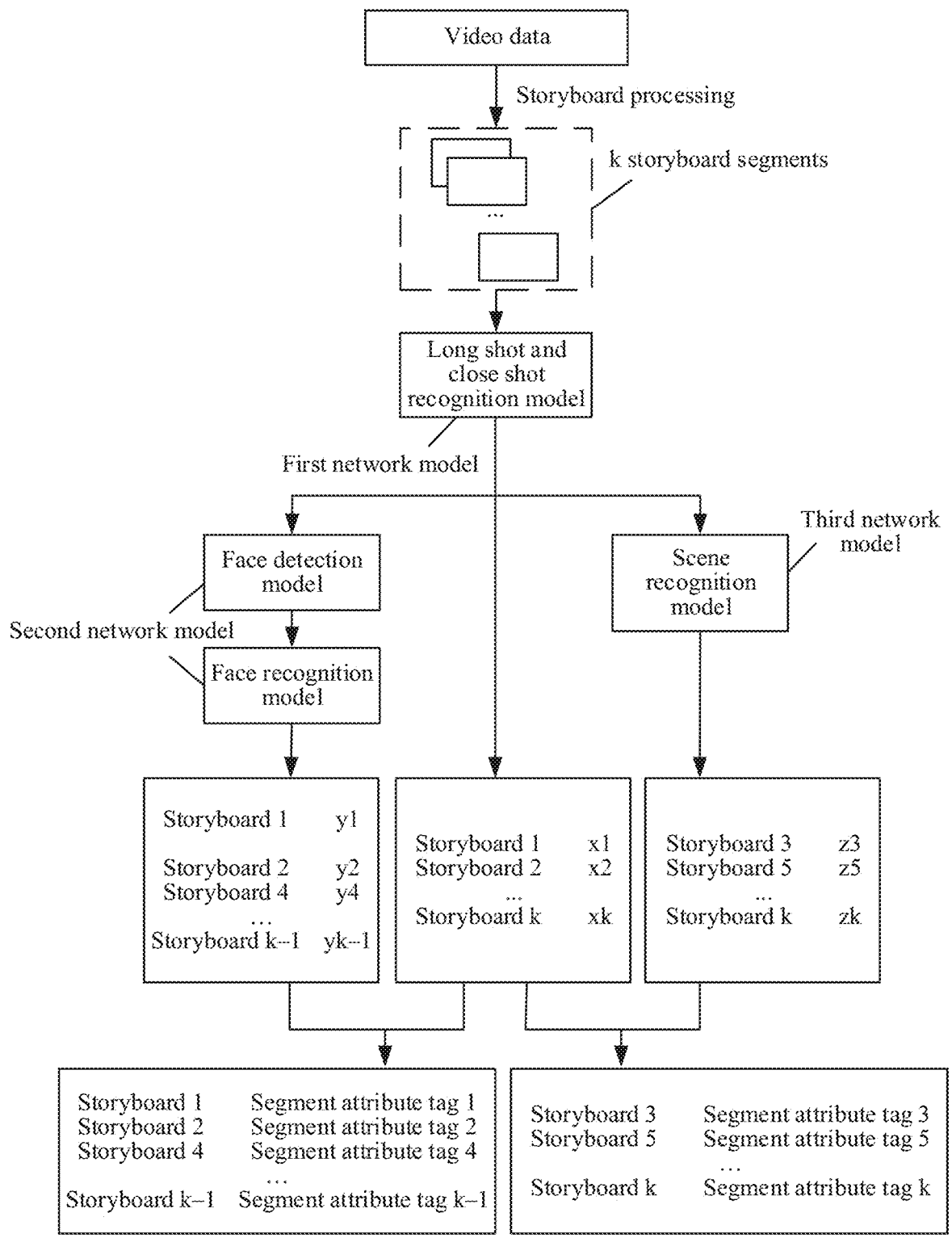
FIG. 6 is a schematic flowchart of extracting a segment attribute tag according to an embodiment of the disclosure.

For ease of understanding, FIG. 6 is a schematic flowchart of extracting a segment attribute tag according to an embodiment of the disclosure. Video data shown in FIG. 6 may be the video data of the target video, and an illustrative process of obtaining the tag information of each storyboard segment may be described as follows: video storyboarding may be performed on a video sequence of the video data to obtain k storyboard segments, and each storyboard segment may be inputted into a network recognition model to obtain tag information of each storyboard segment in the network recognition model. The network recognition model may be the scene recognition model (namely, the third network model), the long shot and close shot recognition model (namely, the first network model), or the face detection model and the face recognition model (namely, the second network model) shown in FIG. 6.

It may be understood that, as shown in FIG. 6, after the k storyboard segments are inputted into the long shot and close shot recognition model, an obtained long shot and close shot tag (namely, the first attribute tag) corresponding to each storyboard segment may be: {storyboard 1:x1, storyboard 2:x2, . . . , storyboard k:xk}, where x1 represents that the long shot and close shot tag corresponding to the storyboard 1 is x1, x2 represents that the long shot and close shot tag corresponding to the storyboard 2 is x2, . . . , and xk represents that the long shot and close shot tag corresponding to the storyboard k is xk. The long shot and close shot tag may include, but not limited to: a long shot, a character close shot, a character close-up, an object full shot, and an object close-up. The storyboard 1, the storyboard 2, . . . , and the storyboard k herein may correspond to the storyboard segment 1, the storyboard segment 2, . . . , and the storyboard segment k in the embodiment corresponding to FIG. 5.

It may be understood that, as shown in FIG. 6, after the k storyboard segments are inputted into the long shot and close shot recognition model, the k storyboard segments may be inputted into the face detection model and the face recognition model. After the k storyboard segments are inputted into the face detection model and the face recognition model, an obtained character tag (namely, the second attribute tag) corresponding to each storyboard segment may be: {storyboard 1:y1, storyboard 2:y2, storyboard 4:y4, . . . , storyboard k−1:k−1}, where y1 represents that the character tag corresponding to the storyboard 1 is y1, y2 represents that the character tag corresponding to the storyboard 2 is y2, y4 represents that the character tag corresponding to the storyboard 4 is y4 . . . , and yk−1 represents that the character tag corresponding to the storyboard k−1 is yk−1. The character tag may include, but not limited to: one person or two persons. The character tag may further include, but not limited to: a man one, a man two, a woman one, a woman two, a little girl A, and a little boy B. The storyboard 3, the storyboard 5, . . . , and the storyboard k do not include a character tag.

It may be understood that, as shown in FIG. 6, after the k storyboard segments are inputted into the face detection model and the face recognition model, storyboard segments whose detection or recognition result is not obtained (namely, no character tag is included) may be inputted into the scene recognition model. After the storyboard segments are inputted into the scene recognition model, an obtained scene tag (namely, the third attribute tag) corresponding to each storyboard may be: {storyboard 3:z3, storyboard 5:z5, . . . , storyboard k:zk}, where z3 represents that the scene tag corresponding to the storyboard 3 is z3, z5 represents that the scene tag corresponding to the storyboard 5 is z5, . . . , and zk represents that the scene tag corresponding to the storyboard k is zk. The scene tag may include, but not limited to: a natural scene, an indoor scene, a character building, a bamboo forest, a riverside, and an amusement park.

It is to be understood that, for one storyboard segment in the k storyboard segments, a long shot and close shot tag and a character tag or a long shot and close shot tag and a scene tag of the storyboard segment may be used to jointly describe a segment attribute tag of the storyboard segment. For example, for the storyboard 1 in the k storyboard segments, the long shot and close shot tag and the character tag of the storyboard 1 may be used to jointly describe the segment attribute tag (namely, the segment attribute tag 1) of the storyboard 1. For example, the long shot and close shot tag corresponding to the storyboard 1 is a long shot (namely, x1 is a long shot), the character tag corresponding to the storyboard 1 is a man one (namely, y1 is a man one), and the segment attribute tag 1 corresponding to the storyboard 1 may be: {long shot, man one}.

Step S102: Determine a video template associated with the target user from a video template database based on a user portrait of the target user, and obtain at least one predetermined template segment and a template tag sequence in the video template, the template tag sequence being formed by a template attribute tag of the at least one template segment.

Specifically, the server may obtain a behavior log table of the target user, and extract behavior data information associated with the target user from the behavior log table. Further, the server may perform user portrait analysis on the behavior data information to obtain a user portrait used for representing the target user, and determine a video template associated with the target user from a video template database based on the user portrait of the target user. The video template may carry a template tag sequence formed by a template attribute tag of each template segment, the template segment is obtained after video analysis is performed on a template video, and the template video is determined according to the behavior data information. The video template database may be stored on the server or may be stored on another device independent of the server. Further, the server may obtain at least one template segment included in the video template and a template tag sequence formed by a template attribute tag of the at least one template segment. It may be understood that, in this embodiment of the disclosure, behavior logs of different users in the application client that are obtained by the server within a target duration may be collectively referred to as a behavior log table.

It may be understood that, the behavior data information is used for recording behavior exchange data (e.g., access, browse, search, and click) generated every time the target user accesses the application client. The behavior exchange data herein may specifically include a type of a video accessed by the target user, a time for browsing the video, the number of times of browsing the video, a record of browsing the video, the number of times of clicking the video, and videos favored, recommended, liked, purchased, coined by the target user.

Figure 7:
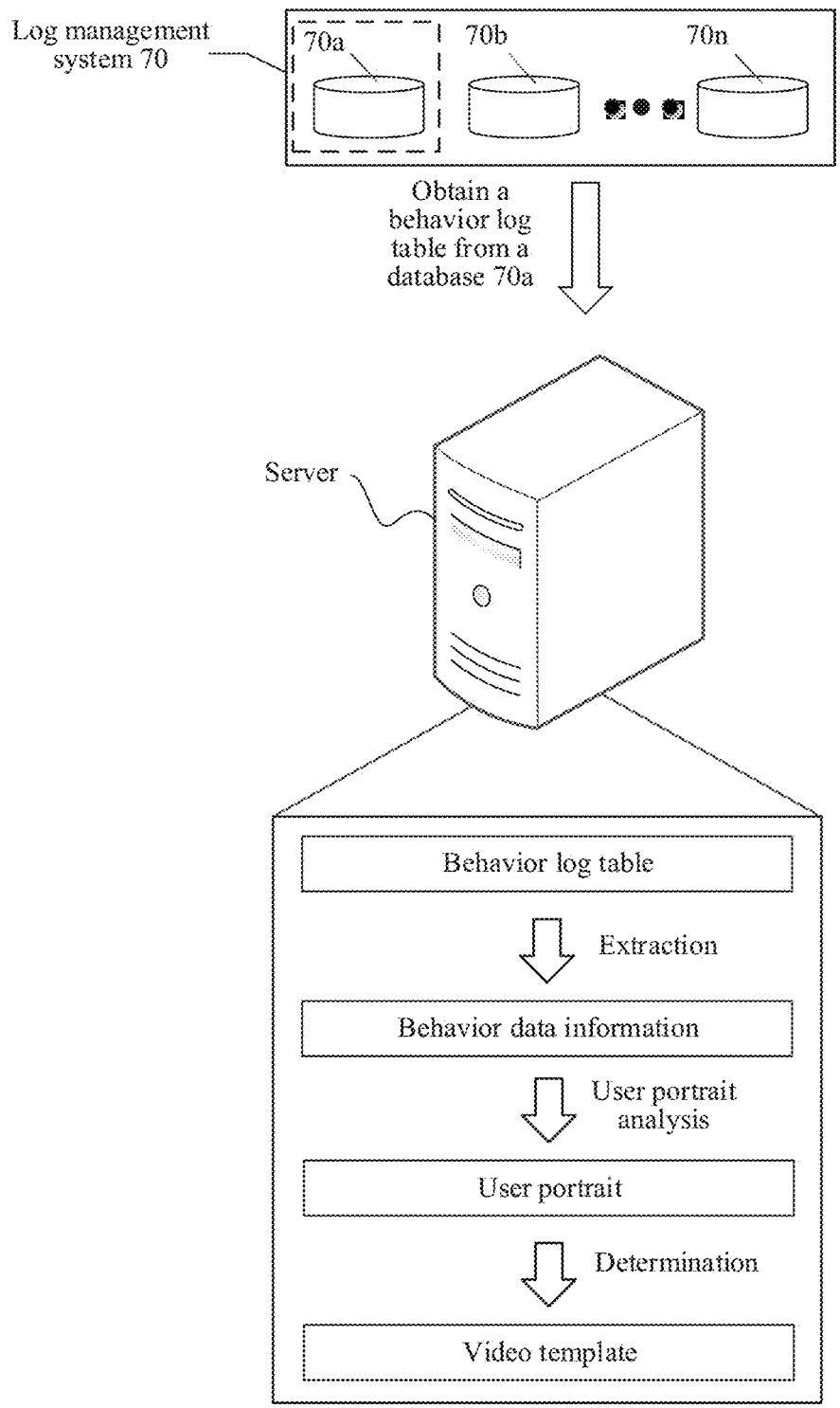
FIG. 7 is a schematic diagram of a scenario of obtaining a video template according to an embodiment of the disclosure.

For ease of understanding, FIG. 7 is a schematic diagram of a scenario of obtaining a video template according to an embodiment of the disclosure. A long management system 70 shown in FIG. 7 may specifically include a plurality of databases, and the plurality of databases may specifically include a database 70a, a database 70b, . . . , and a database 70n shown in FIG. 7. This means that the log management system 70 may be configured to store behavior logs of different users in the application client. For example, the database 70a may be configured to store a behavior log of a user Y1 (not shown in the figure), the database 70b may be configured to store a behavior log of a user Y2 (not shown in the figure), . . . , and the database 70n may be configured to store a behavior log of a user Yn (not shown in the figure).

As shown in FIG. 7, when the target user is the user Y1 (namely, the target user), the server may obtain a behavior log table of the target user within the target duration from the database 70a and may further obtain behavior data information from the behavior log table. It is to be understood that, after the server obtains the behavior data information of the target user, the server may perform user portrait analysis on the behavior data information within the target duration to obtain the user portrait used for representing the target user.

The user portrait herein may include a fondness degree of the target user for one video type, and the server may select a video template of the video type as the video template associated with the target user. Similarly, the user portrait herein may include a fondness degree of the target user for one video, and the server may select a video template corresponding to the video as the video template associated with the target user. It may be understood that, template data corresponding to the video template may be data having a video type same as the video data of the target video. For example, when the target video is a cartoon, the video template associated with the target video may be selected from video templates of a cartoon type. In another example, when the target video is a reality drama, the video template associated with the target video may be selected from video templates of a reality drama type. In this way, an optimal video template may be selected for the target video, to improve a display effect of the video material segment.

It may be understood that, the log management system 70 shown in FIG. 7 may establish a behavior log table for the target user accessing the application client within a single behavior record period (for example, one day is used as a unit of the behavior record period). For example, the log management system 70 may establish a behavior log table when it is detected that the target user first accesses the application client in one day. In this case, the behavior log table records an access timestamp (for example, a moment T1) that the target user currently accesses the application client. This means that the behavior log table does not include any other behavior exchange data before the current moment T1. Further, the log management system 70 may add, when the behavior record period reaches a record period threshold, the behavior log table (for example, a behavior log table 1) established for the target user to a corresponding database (for example, the database 70a shown in FIG. 7) for storage. Similarly, the log management system 70 may add, when the access timestamp of the target user is another moment (for example, a moment T2), a behavior log table (for example, a behavior log table 2) corresponding to the moment T2 to a corresponding database (for example, the database 70a shown in FIG. 7) for storage.

It is to be understood that, when the target user accesses the client within a record period and generates exchange behavior with the application client, the log management system 70 may record the exchange behavior between the target user and the application client in a behavior log table of the record period. It may be understood that, the target duration may specifically include one or a plurality of record periods. Therefore, behavior log tables of the target user obtained by the server within the target duration (namely, by the end of a plurality of record periods before this access to the application client) may specifically include the behavior log table 1 and the behavior log table 2.

Step S103: Screen (or select) at least one video segment matching the template attribute tag of the at least one template segment from the plurality of video segments based on the template attribute tag of the at least one template segment and segment attribute tags corresponding to the plurality of video segments.

Step S104: Splice the at least one matched video segment according to a position of a template attribute tag of each template segment in the at least one template segment in the template tag sequence as a video material segment of the target video.

According to the embodiments of the disclosure, the server may screen (or select) video segments meeting a segment matching condition from a plurality of video segments based on at least one template segment and the template tag sequence, and use the video segments meeting the segment matching condition as the video material segment of the target video.

Specifically, the server may use each of N template segments as a target template segment, determine a queue position of the target template segment in the template tag sequence (e.g., a position or a sequence of the target template segment in a queue formed by the N template segments) as a target queue position, and determine a template attribute tag corresponding to the target queue position as a target template attribute tag. The number of the template segments may be N, and N may be a positive integer greater than 1. Therefore, the template tag sequence may include N sequence positions, one sequence position corresponds to one template attribute tag, and one template attribute tag corresponds to one template segment. Further, the server may screen a segment attribute tag matching the target template attribute tag from segment attribute tags corresponding to the plurality of video segments, and determine one or more video segments corresponding to the screened segment attribute tag as candidate video segments. Further, the server may perthrm similarity analysis on each candidate video segment in the candidate video segments and the target template segment to obtain a similarity threshold between each candidate video segment and the target template segment; determine a maximum similarity threshold in the similarity thresholds, and determine a candidate video segment corresponding to the maximum similarity threshold as a target candidate video segment matching the target template segment. Further, the server may determine a target tag sequence formed by a segment attribute tag corresponding to the target candidate video segment based on the target queue position of the target template segment in the template tag sequence, and perform splicing processing on all target candidate video segments associated with the target tag sequence to obtain the video material segment. That is, the video material segment meeting the segment matching condition is determined according to all the target candidate video segments associated with the target tag sequence. The target tag sequence formed by the segment attribute tag of the video material segment is the same as the template tag sequence.

It may be understood that, the similarity analysis may represent a scene similarity between each candidate video segment and the target template segment. A candidate feature vector corresponding to each candidate video segment may be obtained by inputting the candidate video segment into the third network model. A target feature vector corresponding to the target template segment may be obtained by inputting the target template segment into the third network model. A similarity (namely, the similarity threshold) between each candidate video segment and the target template segment may be obtained by calculating a vector distance between the candidate feature vector and the target feature vector. Considering that the third network model is a scene recognition model, the similarity may represent a scene similarity. The similarity analysis may also represent a long shot and close shot similarity between each candidate video segment and the target template segment, and the similarity analysis may also represent a character similarity between each candidate video segment and the target template segment.

For example, the target feature vector of the target template segment may be obtained by inputting the target template segment into the third network model. It is assumed that there are 2 candidate video segments, the 2 candidate video segments may specifically include a candidate video segment 1 and a candidate video segment 2, and a candidate feature vector 1 of the candidate video segment 1 and a candidate feature vector 2 of the candidate video segment 2 may be obtained by inputting the 2 candidate video segments into the third network model. After a vector distance between the target feature vector and each of the 2 candidate feature vectors is calculated respectively, if a distance between the target feature vector and the candidate feature vector 2 is smallest, it indicates that a similarity threshold between the target template segment and the candidate video segment 2 is the maximum similarity threshold, and the candidate video segment 2 corresponding to the candidate feature vector 2 may be used as the target candidate video segment matching the target template segment. The similarity analysis may further represent a duration relationship between each candidate video segment and the target template segment, and a calculation method of the similarity analysis is not specifically limited in the disclosure.

Figure 8A:
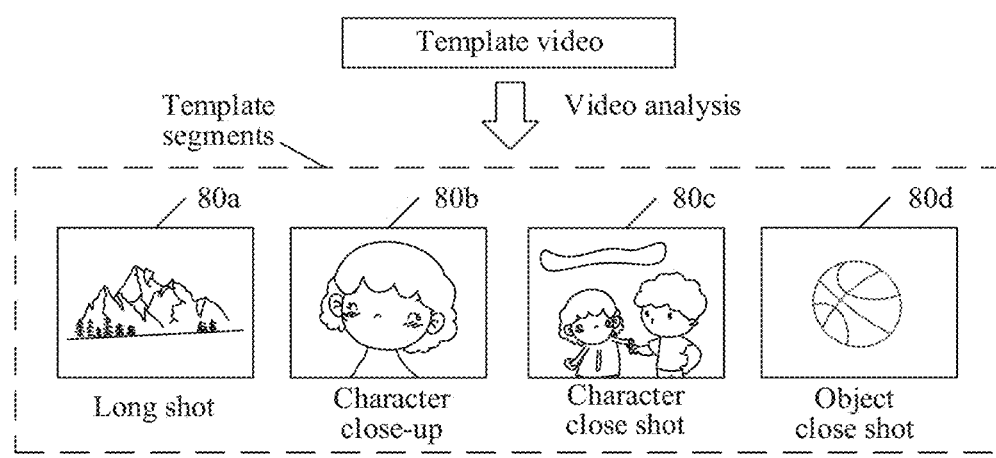
FIG. 8A is a schematic diagram of a scenario of performing video analysis on a template video according to an embodiment of the disclosure.
Figure 8B:
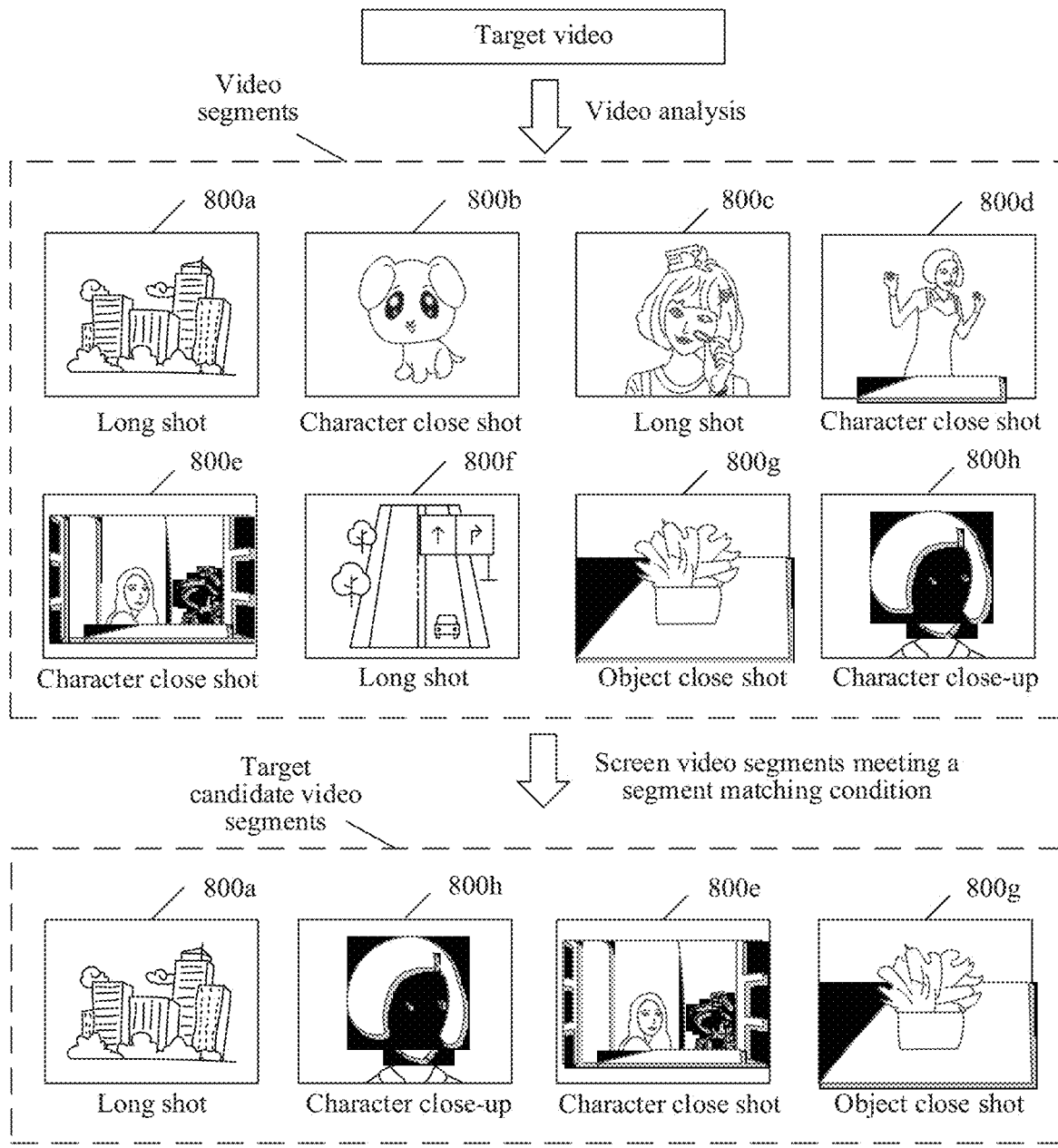
FIG. 8B is a schematic diagram of a scenario of performing video analysis on a target video according to an embodiment of the disclosure.

For ease of understanding, FIG. 8A is a schematic diagram of a scenario of performing video analysis on a template video according to an embodiment of the disclosure, and FIG. 8B is a schematic diagram of a scenario of performing video analysis on a target video according to an embodiment of the disclosure. N template segments shown in FIG. 8A may be obtained after video analysis is performed on the template video, and N may be a positive integer greater than 1. For example, N is equal to 4, and the 4 template segments may include: a template segment 80a, a template segment 80b, a template segment 80c, and a template segment 80d. A template attribute tag corresponding to the template segment 80a is {long shot}, a template attribute tag corresponding to the template segment 80b is {character close-up}, a template attribute tag corresponding to the template segment 80c is {character close shot}, and a template attribute tag corresponding to the template segment 80d is {object close shot}. M video segments shown in FIG. 8B may be obtained after video analysis is performed on the target video, and M may be a positive integer greater than 1. For example, M is equal to 8, and the 8 video segments may include: a video segment 800a, a video segment 800b, a video segment 800c, a video segment 800d, a video segment 800e, a video segment 800f, a video segment 800g, and a video segment 800h. A segment attribute tag corresponding to the video segment 800a is {long shot}, a segment attribute tag corresponding to the video segment 800b is {character close shot}, a segment attribute tag corresponding to the video segment 800c is {long shot}, a segment attribute tag corresponding to the video segment 800d is {character close shot}, a segment attribute tag corresponding to the video segment 800e is {character close shot}, a segment attribute tag corresponding to the video segment 800f is {long shot}, a segment attribute tag corresponding to the video segment 800g is {object close shot}, and a segment attribute tag corresponding to the video segment 800h is {character close-up}.

It may be understood that, if the template segment 80a in the 4 template segments in FIG. 8A is obtained as a target template segment (for example, a target template segment 1), a queue position of the target template segment 1 may be a position 1 (namely, the target queue position is the position 1), and the template attribute tag of the target template segment may be {long shot} (namely, the target template attribute tag is {long shot}). It is screened that the segment attribute tag matching the target template attribute tag is {long shot} from the 8 video segments in FIG. 8B, video segments corresponding to {long shot} are the video segment 800a, the video segment 800c, and the video segment 800f, and candidate video segments corresponding to the target template segment 1 are the video segment 800a, the video segment 800c, and the video segment 800f. Further, after a similarity threshold between each of the 3 candidate video segments and the target template segment 1 is calculated, if the similarity threshold between the video segment 800a and the target template segment 1 is the maximum similarity threshold, the video segment 800a is determined as the target candidate video segment (for example, a target candidate video segment 1) matching the target template segment 1.

Similarly, it may be understood that, if the template segment 80b in the 4 template segments in FIG. 8A is obtained as a target template segment (for example, a target template segment 2), a queue position of the target template segment 2 may be a position 2 (namely, the target queue position is the position 2), and the template attribute tag of the target template segment may be {character close-up} (namely, the target template attribute tag is {character close-up}). It is screened that the segment attribute tag matching the target template attribute tag is {character close-up} from the 8 video segments in FIG. 8B, a video segment corresponding to {character close-up} is the video segment 800h, and the video segment 800h is determined as the target candidate video segment (for example, a target candidate video segment 2) matching the target template segment 2.

Similarly, it may be understood that, if the template segment 80c in the 4 template segments in FIG. 8A is obtained as a target template segment (for example, a target template segment 3), a queue position of the target template segment 3 may be a position 3 (namely, the target queue position is the position 3), and the template attribute tag of the target template segment may be {character close shot} (namely, the target template attribute tag is {character close shot}). It is screened that the segment attribute tag matching the target template attribute tag is {character close shot} from the 8 video segments in FIG. 8B, video segments corresponding to {character close shot} are the video segment 800d and the video segment 800e, and candidate video segments corresponding to the target template segment 3 are the video segment 800d and the video segment 800e. Further, after a similarity threshold between each of the 2 candidate video segments and the target template segment 3 is calculated, if the similarity threshold between the video segment 800*e* and the target template segment 3 is the maximum similarity threshold, the video segment 800*e* is determined as the target candidate video segment (for example, a target candidate video segment 3) matching the target template segment 3.

Similarly, it may be understood that, if the template segment 80*d* in the 4 template segments in FIG. 8A is obtained as a target template segment (for example, a target template segment 4), a queue position of the target template segment 4 may be a position 4 (namely, the target queue position is the position 4), and the template attribute tag of the target template segment may be {object close shot} (namely, the target template attribute tag is {object close shot}). It is screened that the segment attribute tag matching the target template attribute tag is {object close shot} from the 8 video segments in FIG. 8B, a video segment corresponding to {object close shot} is the video segment 800*g*, and the video segment 800*g* is determined as the target candidate video segment (for example, a target candidate video segment 4) matching the target template segment 4.

Therefore, the target candidate video segment 1 corresponding to the position 1 is the video segment 800*a*, the target candidate video segment 2 corresponding to the position 2 is the video segment 800*h*, the target candidate video segment 3 corresponding to the position 3 is the video segment 800*e*, and the target candidate video segment 4 corresponding to the position 4 is the video segment 800*g*, so that a video material segment may be determined through the video segment 800*a*, the video segment 800*h*, the video segment 800*e*, and the video segment 800*g* based on the position 1, the position 2, the position 3, and the position 4. The template tag sequence is a sequence formed by template attribute tags corresponding to the template segments, and the template tag sequence herein may be represented as {long shot, character close-up, character close shot, object close shot}; and the target tag sequence is a sequence formed by segment attribute tags corresponding to the video segments matching the template segments, and the target tag sequence herein may be represented as {long shot, character close-up, character close shot, object close shot}.

It may be understood that, the target template segment 1 and the target candidate video segment 1 may include a similar video playing effect, the target template segment 2 and the target candidate video segment 2 may include a similar video playing effect, the target template segment 3 and the target candidate video segment 3 may include a similar video playing effect, and the target template segment 4 and the target candidate video segment 4 may include a similar video playing effect. Therefore, the video material segment may include a video playing effect same as the foregoing template segments.

It is to be understood that, the server may perform video splicing processing on all the target candidate video segments associated with the target tag sequence to obtain spliced video data associated with the N template segments. Further, the server may obtain template audio data associated with the N template segments, and perform audio and video combination processing on the template audio data and the spliced video data through an audio and video combination component to obtain the video material segment matching the segment matching condition.

Video splicing processing is performed on each target candidate video segment, tools for performing audio and video combination processing on the template audio data and the spliced video data may be the same tool, and the tool may be the foregoing audio and video combination component. The audio and video combination component may be a ffmpeg tool or may be another third-party software tool including a video decapsulation capability. Video decapsulation components are not listed one by one herein again.

Step S105: Push the video data and the video material segment to an application client corresponding to the target user, so that the application client outputs the video data and the video material segment.

It may be understood that, after the video data and the video material segment are received, the application client may play the video data and the video material segment in the application display interface. In an implementation, while the application client plays the video data, the application client may be further configured to display a thumbnail of each video material segment. A specific implementation form of the video material segment outputted by the application client is not limited herein.

In this embodiment of the disclosure, when video data of a video requested by the target user is obtained, the server may perform video analysis on the video data to obtain one or more video segments of the video data. It may be understood that, the video analysis involved in this embodiment of the disclosure mainly includes video storyboarding and attribute analysis. The video storyboarding mainly refers to divide the video data into one or more storyboard segments. In this way, the server may further perform attribute analysis on segment content of each storyboard segment, to obtain a segment attribute tag of each storyboard segment. Therefore, storyboard segments including the segment attribute tag are collectively referred to as the foregoing video segments, and it is to be understood that, one video segment may correspond to one segment attribute tag. Further, when the user portrait of the target user is obtained, the server may quickly determine the video template associated with the target user according to the user portrait. Further, when the template segments (for example, hot short videos) mapped by the video template and the template tag sequence corresponding to the template segments are obtained, video segments matching the segment matching condition may be intelligently screened from the video segments, and the screened video segments meeting the segment matching condition may be used as the video material segment of the target video. It may be understood that, the target tag sequence formed by the segment attribute tag of the video material segment may be the same as the template tag sequence, thereby ensuring that the video material segment includes a video playing effect same as the foregoing template segments. The server may then push the video data and the video material segment to the application client corresponding to the target user, so that the application client may output the video data and the video material segment. As can be seen, in this embodiment of the disclosure, one or more video segments carrying a segment attribute tag may be quickly obtained through video analysis (for example, video storyboarding and attribute analysis). In this way, for the video segments, when one or more video templates are intelligently determined according to the user portrait, the video segments may be respectively screened according to the template tag sequence of each video template, to quickly obtain video segments having a video playing effect similar to the video template. Further, a video material segment may be quickly obtained through combination (for example, short videos that may be pushed to the target user may be quickly obtained), and with the increasing and updating of the video template, storyboards and attribute information of the video segments may be used repeatedly.

Therefore, recognition and processing on video frames in the target video are reduced, the generation efficiency of a short video is improved, computing costs for continuously generating and allocating a large number of short videos for different users are reduced, and computing resources of the server are saved.

Figure 9:
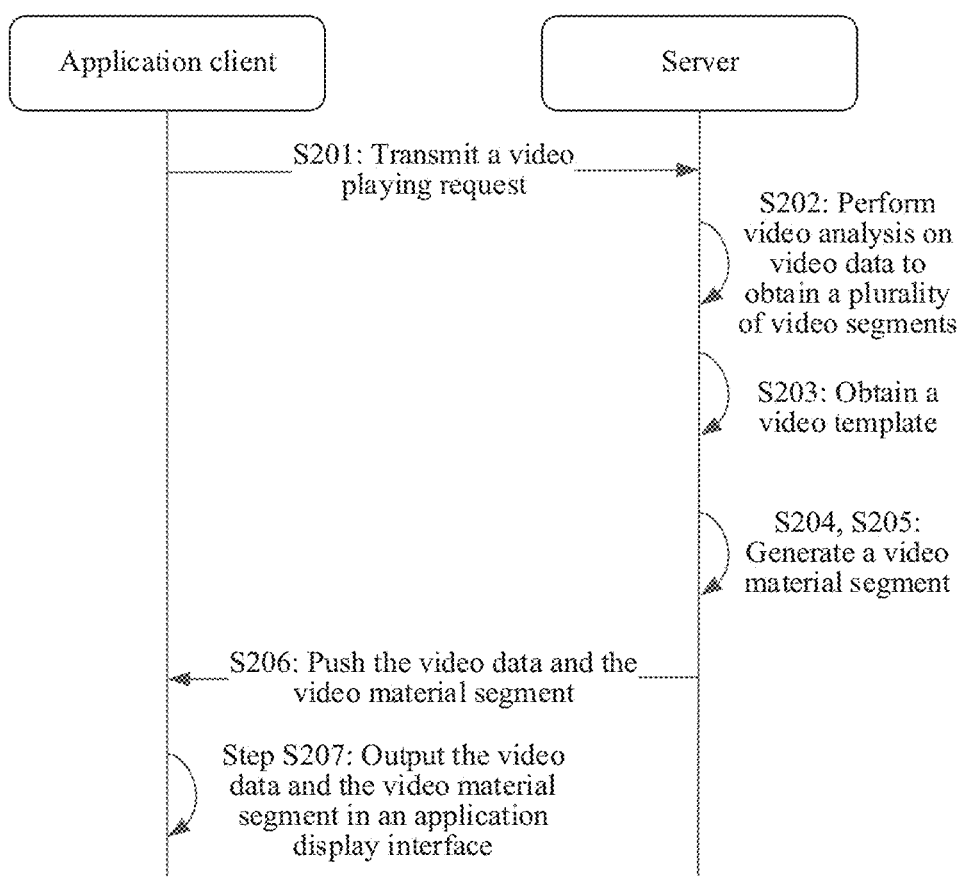
FIG. 9 is a schematic flowchart of a video data processing method according to an embodiment of the disclosure.

FIG. 9 is a schematic flowchart of a video data processing method according to an embodiment of the disclosure. As shown in FIG. 9, the method may be jointly performed by an application client and a server. The application client may be the application client run in the user terminal X in the embodiment corresponding to FIG. 2, and the server may be the server in the embodiment corresponding to FIG. 2. The method may include the following steps:

Step S201: The application client may generate, in response to a play operation performed by a target user on a target video, a video playing request used for requesting to play the target video, and transmit the video playing request to the server, where the video playing request may carry a video identifier of the target video, and the video identifier herein is used for instructing the server to obtain video data of the target video that the target user requests to play. The play operation may include contact operations such as click, long press, and slide, and may also include non-contact operations such as speech or gesture, which is not limited in the disclosure.

Step S202: The server obtains video data of the target video requested by the target user, and performs video analysis on the video data to obtain a plurality of video segments, the video analysis including storyboard processing and attribute analysis based on a plurality of preset segment attribute tags, and each video segment in the plurality of video segments corresponding to one segment attribute tag and one storyboard segment.

Step S203: The server determines a video template associated with the target user from a video template database based on a user portrait of the target user, and obtains at least one predetermined template segment and a template tag sequence in the video template, where the template tag sequence is formed by a template attribute tag of the at least one template segment.

Step S204: The server screens (or selects) at least one video segment matching the template attribute tag of the at least one template segment from the plurality of video segments based on the template attribute tag of the at least one template segment and segment attribute tags corresponding to the plurality of video segments.

Step S205: The server splices the at least one matched video segment according to a position of a template attribute tag of each template segment in the at least one template segment in the template tag sequence as a video material segment of the target video.

Step S206: The server pushes the video data and the video material segment to an application client corresponding to the target user.

Figure 10:
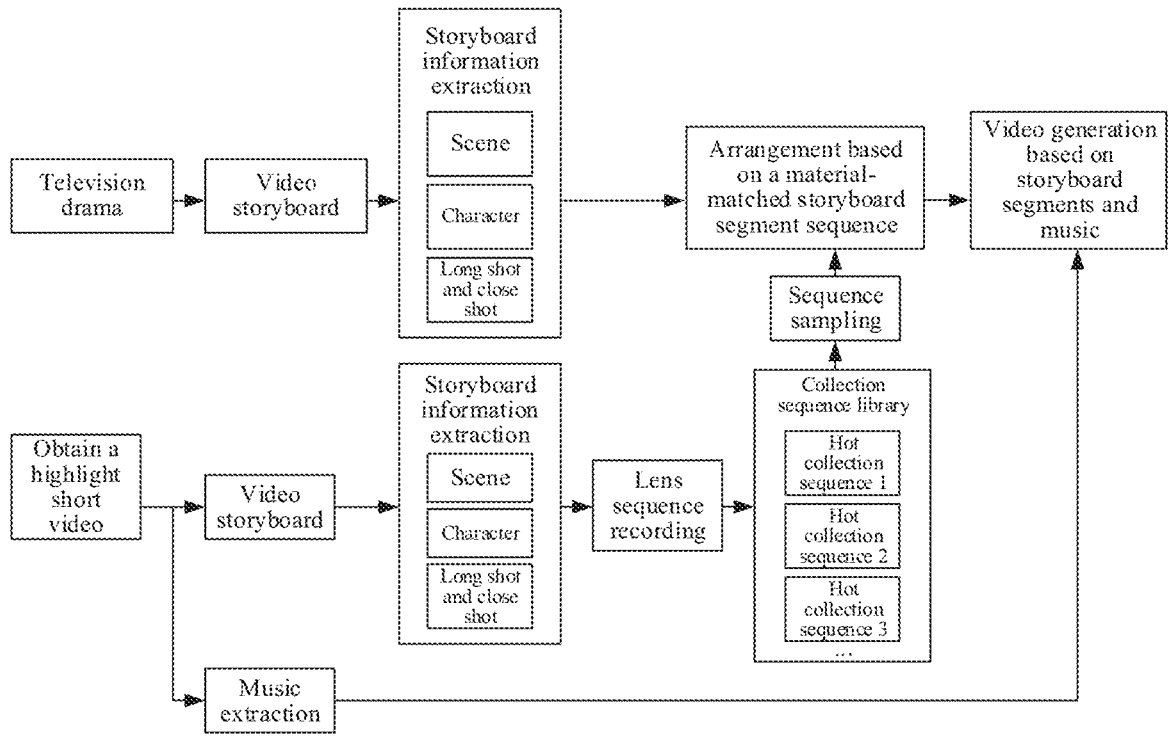
FIG. 10 is a schematic flowchart of generating a video material segment according to an embodiment of the disclosure.

For ease of understanding, FIG. 10 is a schematic flowchart of generating a video material segment according to an embodiment of the disclosure. As shown in FIG. 10, when a highlight short video (namely, a template video) is obtained, the server may perform video analysis on the highlight short video to obtain one or more video segments of the highlight short video, and may further use the one or more video segments of the highlight short video as template segments. It may be understood that, the video analysis involved in this embodiment of the disclosure mainly includes video storyboarding and attribute analysis. The video storyboarding mainly refers to that video data of the highlight short video may be divided into one or more storyboard segments. In this way, the server may further perform attribute analysis (namely, storyboard information extraction) on segment content of each storyboard segment to obtain a template attribute tag of each storyboard segment (namely, the scene tag, the character tag, and/or the long and close shot tag shown in FIG. 10), and storyboard segments including the template attribute tag are collectively referred to as the foregoing template segments, so that a hot collection sequence (namely, a lens sequence record) may be determined based on the template attribute tag. It is to be understood that, one template segment may correspond to one segment attribute tag. In a collection sequence library shown in FIG. 10, a hot collection sequence 1 may be a template attribute tag corresponding to a template segment 1, a hot collection sequence 2 may be a template attribute tag corresponding to a template segment 2, and a hot collection sequence 3 may be a template attribute tag corresponding to a template segment 3.

It is to be understood that, in this embodiment of the disclosure, template segments, a template tag sequence of the template segments, and template audio data (namely, music) of the template videos (namely, the highlight short videos) may be collectively referred to as a video template.

As shown in FIG. 10, when a television drama (namely, a target video) is obtained, the server may perform video storyboarding and attribute analysis on the television drama, to obtain one or a plurality of video segments of the television drama. It is to be understood that, one video segment may correspond to one segment attribute tag. In this way, the server may obtain one or a plurality of hot collection sequences from the collection sequence library (namely, sequence sampling), determine template segments and a template tag sequence corresponding to the template segments according to the selected one or a plurality of hot collection sequences to screen and sort the video segments of the target video, so as to obtain screened video segments (namely, arranged based on a material-matched storyboard segment sequence), and may intelligently a video material segment similar to the template segments according to spliced video data formed by the screened video segments and template audio data of the template segments.

By extracting highlight short videos in various short video platforms and obtaining video templates corresponding to the highlight short videos, the video templates may be accumulated for days. By generating the television drama into one or a plurality of video material segments of corresponding styles according to the video templates, styles of video material segments that are finally generated may be enriched. One television drama be generated into video material segments of a plurality of styles according to a plurality of video templates, so that recommendation and selection for various persons in a video recommendation scenario may be implemented. In addition, for each video template, video analysis and video matching may be performed on the highlight short videos and the television drama through deep learning and an image analysis algorithm, so that an objective of automatic analysis may be achieved. In addition, for a new television drama, analysis on the television drama may be completed with a limited transferring capability, so that a generation difficulty for video material segments of the new television drama is reduced, and the transferability for generating video material segments is great.

It is to be understood that, for an example process in which the server performs video storyboarding and attribute analysis on the television drama, reference may be made to the description of step S102, and details are not described herein again. It is to be understood that, for an example process in which the server performs video storyboarding and attribute analysis on the highlight short videos, reference may be made to the description of video storyboarding and attribute analysis performed by the server on the television drama, and details are not described herein again.

Step S207: The application client outputs the video data and the video material segment in an application display interface.

Specifically, the application client may receive the video data of the target video and the video material segment associated with the target video that are returned by the server based on the video playing request, determine a video playing interface used for playing the video data in the application display interface of the application client, and play the video data in the video playing interface. Further, the application client may play a corresponding video material segment in the application display interface of the application client in response to a trigger operation on the application display interface. The trigger operation may include contact operations such as click, long press, and slide, and may also include non-contact operations such as speech or gesture, which is not limited in the disclosure. In an implementation, it may be understood that, after the video material segment is obtained, the application client may display a thumbnail of each video material segment in the application display interface, or dynamically play an animation of each video material segment in the application display interface, and a specific presentation form of the video material segment is not limited herein.

Figure 11:
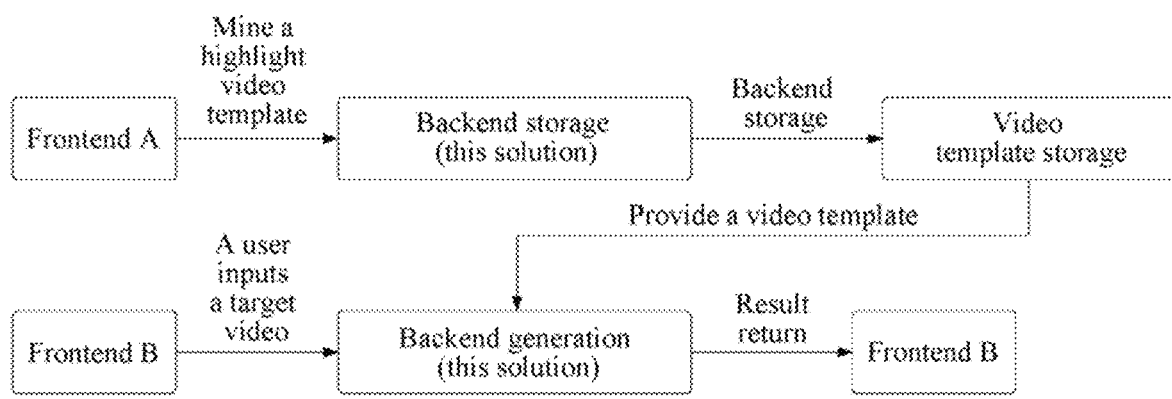
FIG. 11 is a schematic flowchart of frontend and backend interaction according to an embodiment of the disclosure.

For ease of understanding, FIG. 11 is a schematic flowchart of frontend and backend interaction according to an embodiment of the disclosure. It may be understood that, the application client may be run in a frontend B shown in FIG. 11. A play operation performed by the target user on a target video (for example, a video in which the target user is interested) in the application client in the frontend B is that the target video is inputted into the frontend B. Further, the server (namely, a backend) may generate one or more video material segments associated with the target video based on a video template (namely, backend generation). Further, the server may return video data of the target video and the one or more video material segments (for example, video titbits of the video) associated with the target video to the frontend B. That is, the video data and the one or more video material segments returned by the server are displayed in the application display interface of the frontend B. It is to be understood that, the video template may be determined by the server based on a user portrait of the target user.

It may be understood that, as shown in FIG. 11, a frontend A may be another user terminal corresponding to a video editor. After video analysis is performed on highlight short videos inputted from the frontend A, the video editor may select one or more video segments from video segments obtained through the video analysis as template segments, and may determine a video template based on the template segments (namely, highlight video templates). The frontend A may receive an input of a highlight short video and then upload a video template (namely, a highlight video template) corresponding to the highlight short video to the server for storage (namely, backend storage).

It is to be understood that, the frontend B and the frontend A may be the same user terminal, namely, the frontend B (or the frontend A) may be an input party of the highlight short video and may also be an input party of the target video.

Figure 12A:
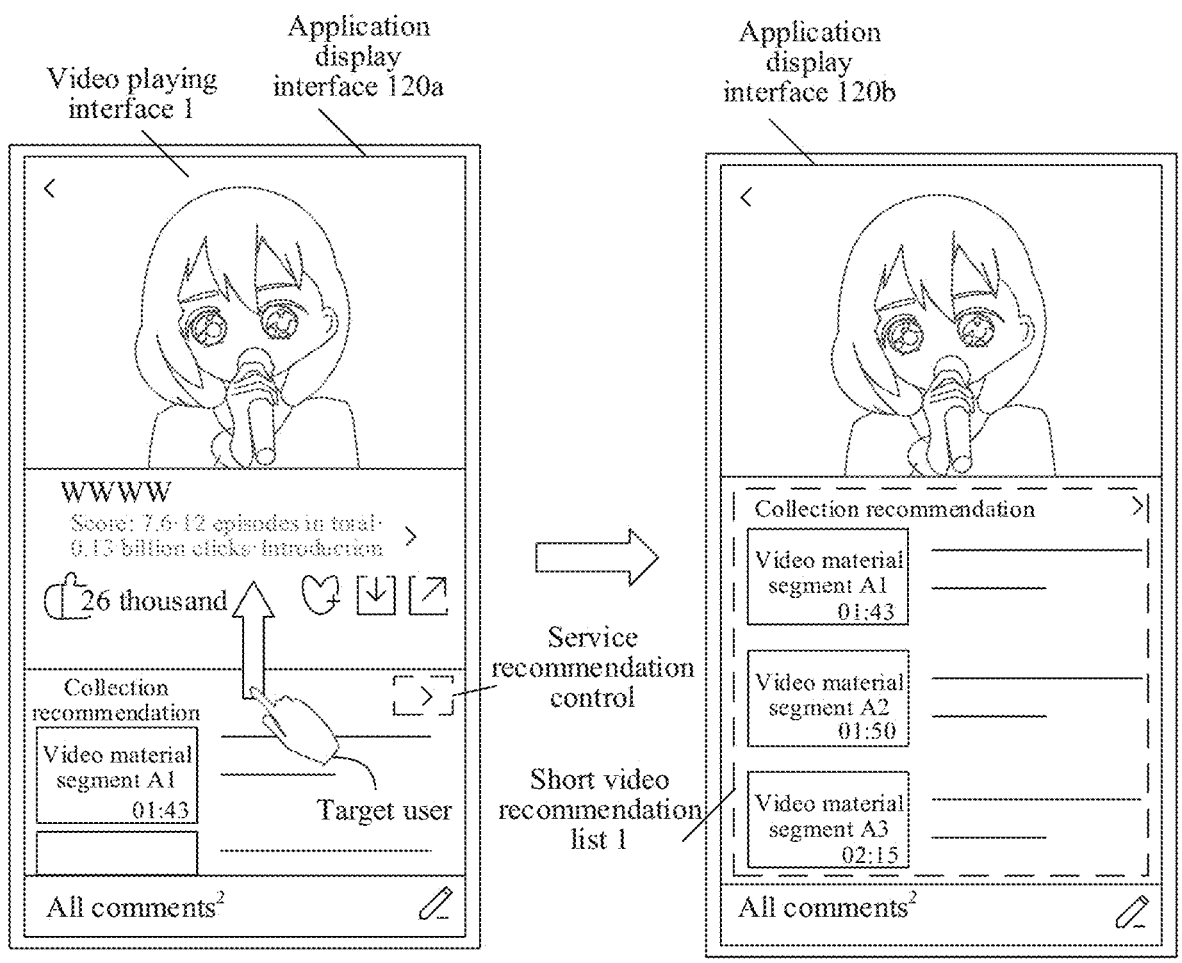
FIG. 12A is a schematic diagram of a scenario of outputting a video material segment according to an embodiment of the disclosure.

For ease of understanding, FIG. 12A is a schematic diagram of a scenario of outputting a video material segment according to an embodiment of the disclosure. As shown in FIG. 12A, an application display interface 120a may be the application display interface in the embodiment corresponding to FIG. 2. The application display interface 120a may include a video playing interface 1 used for playing the target video, and may further include a short video recommendation list (for example, a short video recommendation list 1) used for displaying or playing video material segments. The short video recommendation list 1 may at least include video material segments associated with the target video. The video material segments herein may be the video material segments associated with the target video in the first service database. After the target user performs a trigger operation (for example, a slide operation shown in FIG. 12A) on the application display interface 120a, the application client may display or play the video material segments in the short video recommendation list 1 in a collection recommendation part of an application display interface 120b. In an implementation, when the application client plays the target video in a video playing interface 1, the application client may further play the video material segments in the short video recommendation list 1 in a traversing (or synchronous) manner. As shown in FIG. 12A, the short video recommendation list 1 may specifically include N video material segments associated with the target video. The N video material segments may specifically be 3 video material segments shown in FIG. 12A. For example, the 3 video material segments may specifically include a video material segment A1, a video material segment A2, and a video material segment A3.

In an implementation, after the target user performs a trigger operation (for example, a click operation) on a service recommendation control in the application display interface 120a, the application client may display or play the video material segments in the short video recommendation list 1 in the collection recommendation part of the application display interface 120b, for example, the video material segment A1, the video material segment A2, and the video material segment A3 in the application display interface 120b.

Figure 12B:
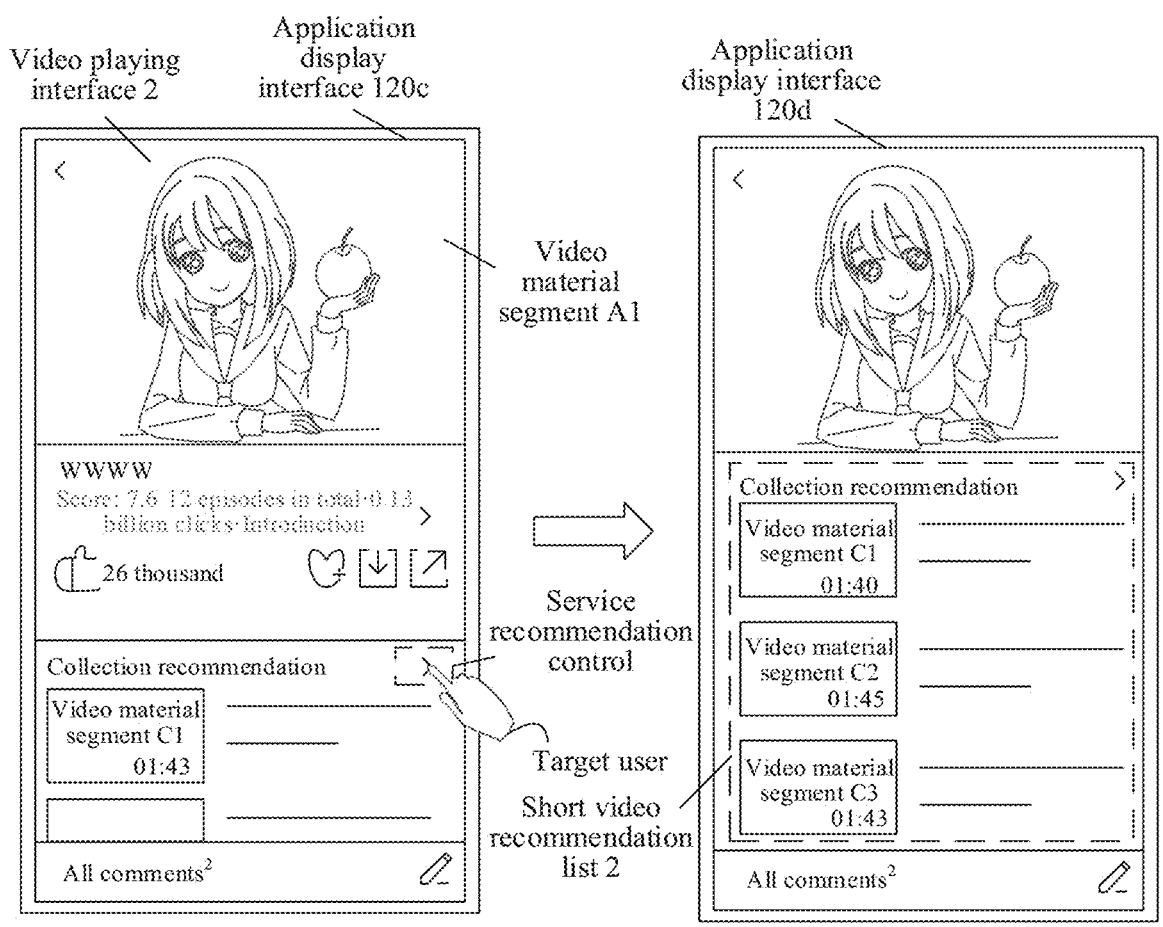
FIG. 12B is a schematic flowchart of a scenario of updating a video material segment according to an embodiment of the disclosure.

For ease of understanding, FIG. 12B is a schematic flowchart of a scenario of updating a video material segment according to an embodiment of the disclosure. As shown in FIG. 12B, when the target user performs a trigger operation (for example, a click operation) on the video material segment A1 in FIG. 12A, the server may return video data (for example, video data J) of the video material segment A1 and one or more video material segments (for example, a video material segment C1, a video material segment C2, and a video material segment C3) associated with the video data J to the application client, so as to play the video data J in the application client. In an implementation, while the video data J of the video material segment A1 is played, the application client may also display the received video material segments to obtain an application display interface 120c.

The application display interface 120c herein may include a video playing interface 2 used for playing the video data J, and may further include a short video recommendation list (for example, a short video recommendation list 2) used for displaying the video material segments. The short video recommendation list 2 may at least include the video material segments associated with the video data J. After the target user performs a trigger operation (for example, a click operation shown in FIG. 12B) on a service recommendation control in the application display interface 120c, the application client may display or play the video material segments in the short video recommendation list 2 in a collection recommendation part of an application display interface 120d. The video material segments herein may be video material segments including the same video template as the video material segment A1 in the second service database. As shown in FIG. 12B, the short video recommendation list 2 may specifically include M video material segments associated with the video data J. The M video material segments may specifically be 3 video material segments shown in FIG. 12B. For example, the 3 video material segments may specifically include the video material segment C1, the video material segment C2, and the video material segment C3.

In an implementation, after the target user performs a trigger operation (for example, a slide operation) on the application display interface 120c, the application client may display or play the video material segments in the short video recommendation list 2 in the collection recommendation part of the application display interface 120d, for example, the video material segment C1, the video material segment C2, and the video material segment C3 in the application display interface 120d.

It is to be understood that, after the target user completes watching of the video material segment A1 in the application client, the video material segments in the short video recommendation list 2 may be intelligently played for the target user in a traversing manner in the application client. For example, when the target user completes watching of the video material segment A1 in the application client, the server may output the video material segment C1 in the plurality of video material segments in the short video recommendation list 2 to the application client, so as to intelligently play the video material segment C1 in the application client. In an implementation, the application client may further record, when the video data played in the video playing interface 1 of the application client is updated to the video material segment A1, a current playing progress (for example, a moment T) of the target video, so as to continue to play the target video from the moment T of the target video after the video material segment A1 is completely played.

It may be understood that, the application client may dynamically adjust positions of video material segments in the short video recommendation list in real time according to a current playing progress of the target video, so as to recommend video material segments arranged in different sequence for the target user. For example, if before the current playing progress, all video segments forming the video material segments are included, namely, watching of all the video segments forming the video material segments is completed at a current moment, the video material segments may be ranked in front of the short video recommendation list, to implement story replay. In an implementation, the application client may further sort the video material segments in a video recommendation list according to the number of played times of a current video material segment on an application client of another user terminal. If a total number of played times of a video material segment is relatively great, it indicates that the video material segment has a relatively high quality, and the video material segment may be first recommended to the target user, namely, the video material segment is ranked in front of the short video recommendation list.

As can be seen, in this embodiment of the disclosure, one or more video segments carrying a segment attribute tag may be quickly obtained by performing video analysis (for example, video storyboarding and attribute analysis) on video data. In this way, for the video segments, when one or more video templates are accurately determined according to the user portrait, the video segments may be respectively intelligently screened according to the template tag sequence of each video template, to quickly obtain video segments having a video playing effect similar to the video template. Further, a video material segment may be quickly obtained through combination (for example, short videos that may be displayed to the target user may be quickly obtained), and with the increasing and updating of the video template, storyboards and attribute information of the video segments may be used repeatedly. Therefore, recognition and processing on video frames in the target video are reduced, the generation efficiency of a short video is improved, computing costs for continuously generating and allocating a large number of short videos for different users are reduced, and computing resources of the server are saved.

Figure 13:
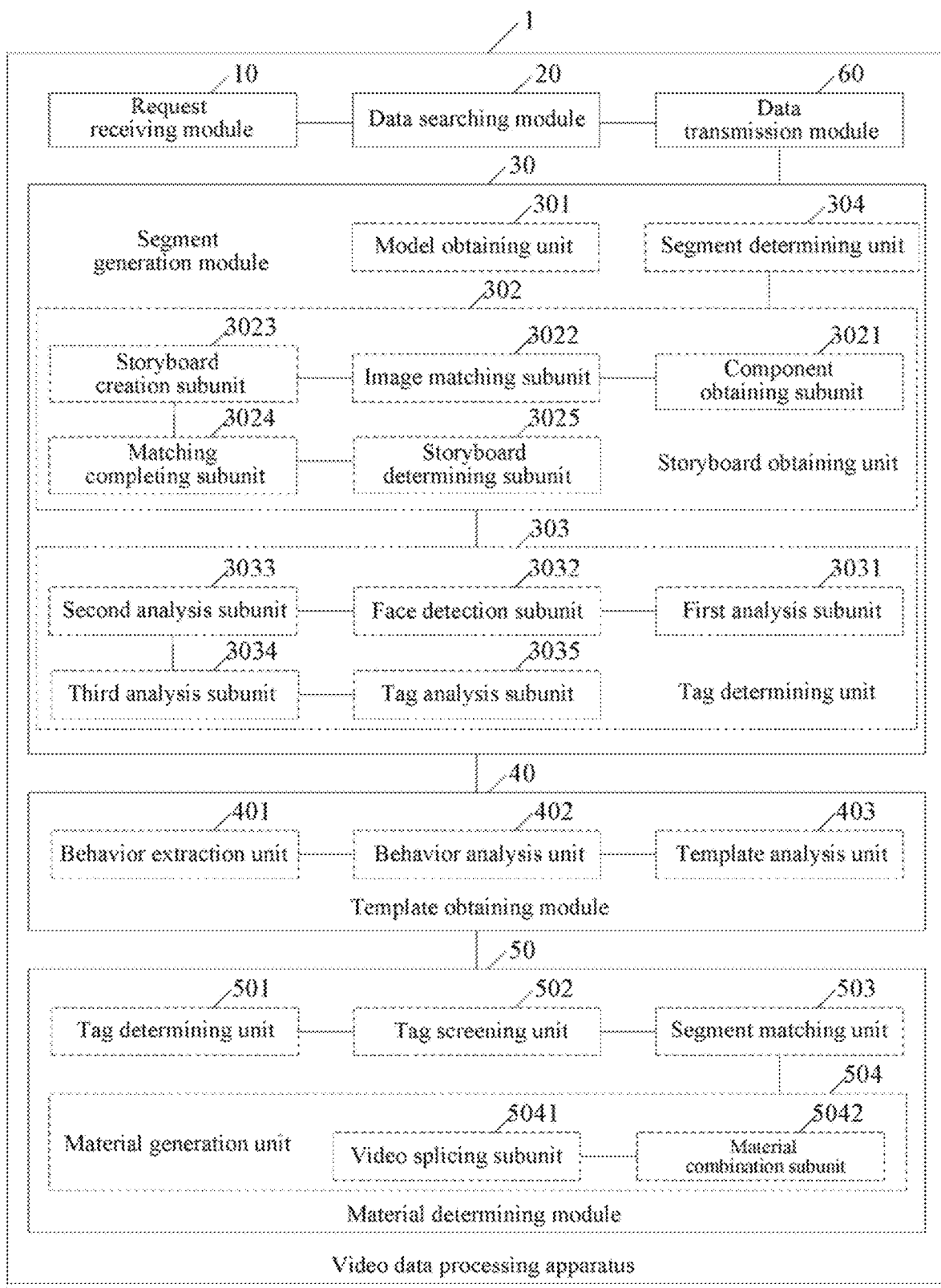
FIG. 13 is a schematic structural diagram of a video data processing apparatus according to an embodiment of the disclosure.

FIG. 13 is a schematic structural diagram of a video data processing apparatus according to an embodiment of the disclosure. The video data processing apparatus 1 may include: a segment generation module 30, a template obtaining module 40, a material determining module 50, and a data transmission module 60. Further, the video data processing apparatus 1 may further include a request receiving module 10 and a data searching module 20.

The segment generation module 30 is configured to obtain video data of a target video requested by a target user, and perform video analysis on the video data to obtain a plurality of video segments, the video analysis including storyboard processing and attribute analysis based on a plurality of preset segment attribute tags, and each video segment in the plurality of video segments corresponding to one segment attribute tag and one storyboard segment.

The segment generation module 30 includes a model obtaining unit 301, a storyboard obtaining unit 302, a tag determining unit 303, and a segment determining unit 304.

The model obtaining unit 301 is configured to obtain the video data of the target video requested by the target user and a network recognition model associated with the video data.

The storyboard obtaining unit 302 is configured to perform storyboard processing on a video sequence corresponding to the video data through a video partitioning component, to obtain a plurality of storyboard segments associated with the video sequence.

The storyboard obtaining unit 302 includes a component obtaining subunit 3021, an image matching subunit 3022, a storyboard creation subunit 3023, a matching completing subunit 3024, and a storyboard determining subunit 3025.

The component obtaining subunit 3021 is configured to determine a first video frame serving as a cluster centroid in the video sequence through the video partitioning component, and create storyboard cluster information of a storyboard cluster to which the first video frame belongs.

The image matching subunit 3022 is configured to determine video frames other than the first video frame in the video sequence as second video frames, obtain each second video frame in the second video frames sequentially based on a pooling mechanism, and determine an image similarity between each second video frame and the first video frame.

The storyboard creation subunit 3023 is configured to divide (or allocate), in a case that the image similarity between the first video frame and a second video frame is greater than or equal to a clustering threshold, the second video frame whose image similarity is greater than or equal to the clustering threshold to the storyboard cluster to which the first video frame belongs.

The matching completing subunit 3024 is configured to update, in a case that the image similarity between the first video frame and a second video frame is less than the clustering threshold, the first video frame using the second video frame whose image similarity is less than the clustering threshold, create storyboard cluster information of a storyboard cluster to which the updated first video frame belongs, and sequentially perform image similarity matching between the updated first video frame and second video frames that were not previously matched until image similarity matching is performed on each video frame in the video sequence, to obtain storyboard cluster information of a storyboard cluster to which each video frame in the video sequence belongs.

The storyboard determining subunit 3025 is configured to form each video frame in the video sequence into the plurality of storyboard segments based on the storyboard cluster information of the storyboard cluster to which each video frame in the video sequence belongs.

For illustrative implementations of the component obtaining subunit 3021, the image matching subunit 3022, the storyboard creation subunit 3023, the matching completing subunit 3024, and the storyboard determining subunit 3025, reference may be made to the description of step S101 in the embodiment corresponding to FIG. 3, and details are not described herein again.

The tag determining unit 303 is configured to input the plurality of storyboard segments into a network recognition model, and perform attribute analysis on the plurality of storyboard segments through the network recognition model based on the plurality of preset segment attribute tags, to obtain segment attribute tags corresponding to the plurality of storyboard segments.

The network recognition model includes at least a first network model including a first attribute tag extraction function, a second network model including a second attribute tag extraction function, and a third network model including a third attribute tag extraction function.

The tag determining unit 303 includes a first analysis subunit 3031, a face detection subunit 3032, a second analysis subunit 3033, a third analysis subunit 3034, and a tag analysis subunit 3035.

The first analysis subunit 3031 is configured to input the plurality of storyboard segments into the first network model, perform long shot and close shot analysis on each storyboard segment in the plurality of storyboard segments through the first network model to obtain long shot and close shot tags of the plurality of storyboard segments, use the long shot and close shot tags of the plurality of storyboard segments as a first attribute tag outputted by the first network model, and use storyboard segments including the first attribute tag as storyboard segments of a first type.

The face detection subunit 3032 is configured to input the storyboard segments of the first type into the second network model, and perform face detection on each storyboard segment in the storyboard segments of the first type through the second network model to obtain a face detection result.

The second analysis subunit 3033 is configured to use, in a case that the face detection result indicates that a face of a target character exists in the storyboard segments of the first type, storyboard segments corresponding to the face of the target character existing in the storyboard segments of the first type as storyboard segments of a second type, determine a character tag to which the target character in the storyboard segments of the second type belongs through the second network model, and determine the character tag to which the target character belongs as a second attribute tag of the storyboard segments of the second type, where the target character is one or more characters in the target video.

The third analysis subunit 3034 is configured to determine storyboard segments other than the storyboard segments of the second type in the storyboard segments of the first type as storyboard segments of a third type, input the storyboard segments of the third type into the third network model, and perform scene detection on each storyboard segment in the storyboard segments of the first type through the third network model to obtain a third attribute tag of the storyboard segments of the third type.

The tag analysis subunit 3035 is configured to determine a segment attribute tag corresponding to each storyboard segment in the plurality of storyboard segments according to the first attribute tag of the storyboard segments of the first type, the second attribute tag of the storyboard segments of the second type, and the third attribute tag of the storyboard segments of the third type.

For illustrative implementations of the first analysis subunit 3031, the face detection subunit 3032, the second analysis subunit 3033, the third analysis subunit 3034, and the tag analysis subunit 3035, reference may be made to the description of step S101 in the embodiment corresponding to FIG. 3, and details are not described herein again.

The segment determining unit 304 is configured to determine the plurality of storyboard segments including the segment attribute tags as the plurality of video segments of the video data.

For illustrative implementations of the model obtaining unit 301, the storyboard obtaining unit 302, the tag determining unit 303, and the segment determining unit 304, reference may be made to the description of step S101 in the embodiment corresponding to FIG. 3, and details are not described herein again.

The template obtaining module 40 is configured to determine a video template associated with the target user from a video template database based on a user portrait of the target user, and obtain at least one predetermined template segment and a template tag sequence in the video template, the template tag sequence being formed by a template attribute tag of the at least one template segment.

The template obtaining module 40 includes: a behavior extraction unit 401, a behavior analysis unit 402, and a template analysis unit 403.

The behavior extraction unit 401 is configured to obtain a behavior log table of the target user, and extract behavior data information associated with the target user from the behavior log table.

The behavior analysis unit 402 is configured to perform user portrait analysis on the behavior data information to obtain a user portrait used for representing the target user, and determine a video template associated with the target user from a video template database based on the user portrait of the target user.

The template analysis unit 403 is configured to obtain the at least one predetermined template segment and the template tag sequence in the video template.

For illustrative implementations of the behavior extraction unit 401, the behavior analysis unit 402, and the template analysis unit 403, reference may be made to the description of step S102 in the embodiment corresponding to FIG. 3, and details are not described herein again.

The material determining module 50 is configured to screen (or select) at least one video segment matching the template attribute tag of the at least one template segment from the plurality of video segments based on the template attribute tag of the at least one template segment and segment attribute tags corresponding to the plurality of video segments, and splice the at least one matched video segment according to a position of each template segment in the at least one template segment as a video material segment of the target video.

The number of the template segments is N, and N is a positive integer greater than 1; The template tag sequence includes N sequence positions, one sequence position corresponds to one template attribute tag, and one template attribute tag corresponds to one template segment.

The material determining module 50 includes a tag determining unit 501, a tag screening unit 502, a segment matching unit 503, and a material generation unit 504.

The tag determining unit 501 is configured to use each of the N template segments as a target template segment, determine a queue position of the target template segment in the template tag sequence as a target queue position, and determine a template attribute tag corresponding to the target queue position as a target template attribute tag.

The tag screening unit 502 is configured to screen a segment attribute tag matching the target template attribute tag from the segment attribute tags corresponding to the plurality of video segments, and determine one or more video segments corresponding to the screened segment attribute tag as candidate video segments.

The segment matching unit 503 is configured to perform similarity analysis on each candidate video segment in the candidate video segments and the target template segment to obtain a similarity threshold between each candidate video segment and the target template segment, determine a maximum similarity threshold in the similarity thresholds, and determine a candidate video segment corresponding to the maximum similarity threshold as a target candidate video segment matching the target template segment.

The material generation unit 504 is configured to determine a target tag sequence formed by a segment attribute tag corresponding to the target candidate video segment based on the target queue position of the target template segment in the template tag sequence, and perform splicing processing on all target candidate video segments associated with the target tag sequence to obtain the video material segment.

The material generation unit 504 includes a video splicing subunit 5041 and a material combination subunit 5042.

The video splicing subunit 5041 is configured to perform video splicing processing on all the target candidate video segments associated with the target tag sequence to obtain spliced video data associated with the N template segments.

The material combination subunit 5042 is configured to obtain template audio data associated with the N template segments, and perform audio and video combination processing on the template audio data and the spliced video data through an audio and video combination component to obtain the video material segment.

For illustrative implementations of the video splicing subunit 5041 and the material combination subunit 5042, reference may be made to the description of step S103 and step S104 in the embodiment corresponding to FIG. 3, and details are not described herein again.

For illustrative implementations of the tag determining unit 501, the tag screening unit 502, the segment matching unit 503, and the material generation unit 504, reference may be made to the description of step S103 and step S104 in the embodiment corresponding to FIG. 3, and details are not described herein again.

The data transmission module 60 is configured to push the video data and the video material segment to an application client corresponding to the target user, so that the application client outputs the video data and the video material segment.

In an implementation, the request receiving module 10 is configured to receive a video stream obtaining request transmitted by an application client; and the video playing request is generated by the application client in response to a play operation performed by the target user on the target video.

The data searching module 20 is configured to extract a video identifier of the target video from the video playing request, search for service video data corresponding to the target video in a video service database based on the video identifier, and use the searched service video data as the video data of the target video in the application client.

For illustrative implementations of the segment generation module 30, the template obtaining module 40, the material determining module 50, and the data transmission module 60, reference may be made to the description of step S101 to step S105 in the embodiment corresponding to FIG. 3, and details are not described herein again. In an implementation, for illustrative implementations of the request receiving module 10 and the data searching module 20, reference may be made to the description of step S201 and step S207 in the embodiment corresponding to FIG. 9, and details are not described herein again. In addition, beneficial effects achieved by using the same method are not described herein again.

Figure 14:
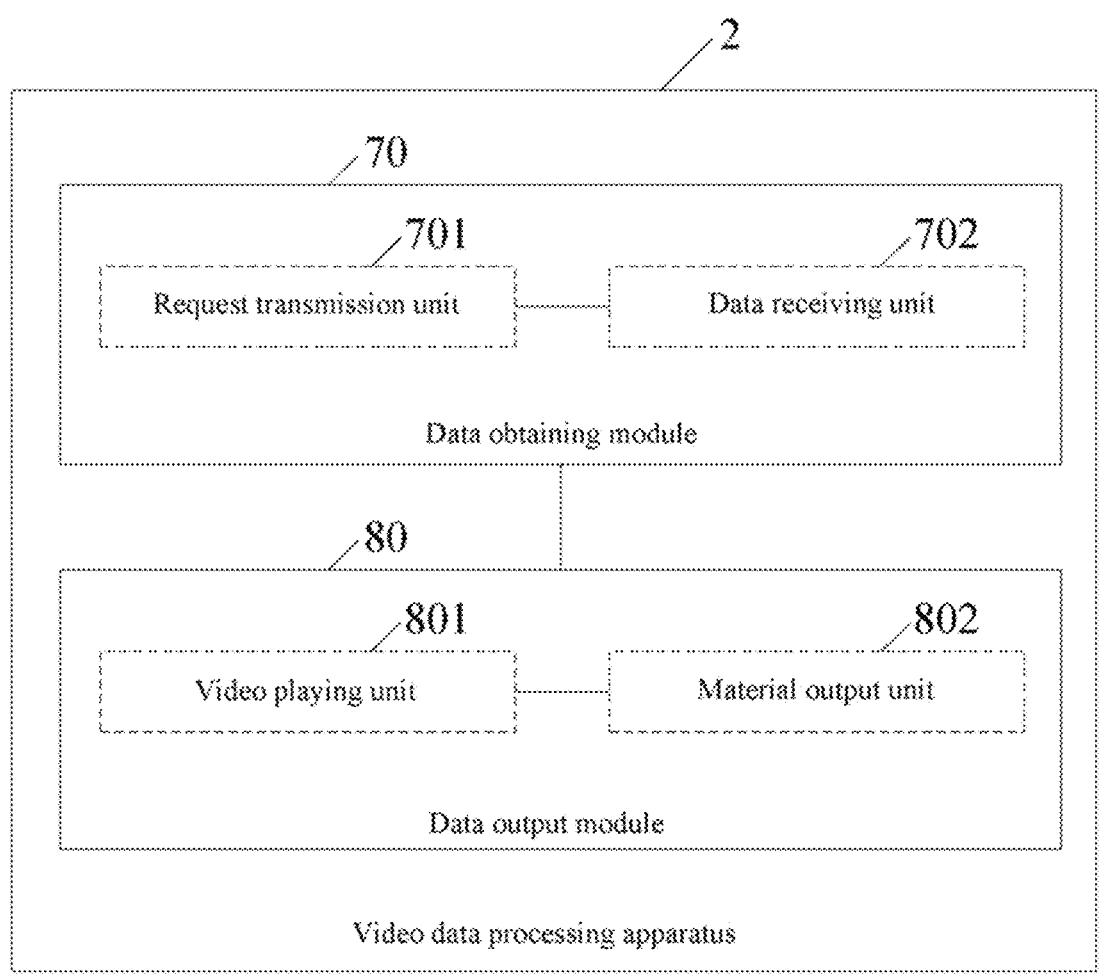
FIG. 14 is a schematic structural diagram of a video data processing apparatus according to an embodiment of the disclosure.

FIG. 14 is a schematic structural diagram of a video data processing apparatus according to an embodiment of the disclosure. the video data processing apparatus 2 may include a data obtaining module 70 and a data output module 80.

The data obtaining module 70 is configured to obtain, in response to a play operation performed by a target user on a target video in an application client, video data of the target video and a video material segment associated with the target video from a server, where the video material segment is a plurality of video segments obtained by video analysis performed by the server on the video data, the video analysis includes storyboard processing and attribute analysis based on a plurality of preset segment attribute tags, and each video segment in the plurality of video segments corresponds to one segment attribute tag and one storyboard segment; a video template associated with the target user is determined from a video template database based on a user portrait of the target user, and at least one predetermined template segment and a template tag sequence in the video template are obtained, where the template tag sequence is formed by a template attribute tag of the at least one template segment; at least one video segment matching the template attribute tag of the at least one template segment is screened from the plurality of video segments based on the template attribute tag of the at least one template segment and segment attribute tags corresponding to the plurality of video segments; and the video material segment is obtained by splicing the at least one matched video segment according to a position of a template attribute tag of each template segment in the at least one template segment in the template tag sequence.

The data obtaining module 70 includes a request transmission unit 701 and a data receiving unit 702.

The request transmission unit 701 is configured to generate, in response to the play operation performed by the target user on the target video in the application client, a video playing request used for requesting to play the target video, and transmit the video playing request to the server, where the video playing request carries a video identifier of the target video; and the video identifier is used for instructing the server to obtain the video data of the target video that the target user requests to play.

The data receiving unit 702 is configured to receive the video data and the video material segment associated with the target video returned by the server based on the video playing request, where the video material segment is obtained after video analysis and video matching are performed on the video data by the server according to the video template in a case that the video template is determined according to the user portrait of the target user, and the user portrait is determined according to user behavior information of the target user in the application client.

For example function implementations of the request transmission unit 701 and the data receiving unit 702, reference may be made to the description of step S201 in the embodiment corresponding to FIG. 9, and details are not described herein again.

The data output module 80 is configured to output the video data and the video material segment in an application display interface of the application client.

The data output module includes a video playing unit 801 and a material output unit 802.

The video playing unit 801 is configured to determine a video playing interface used for playing the video data in the application display interface of the application client, and play the video data in the video playing interface.

The material output unit 802 is configured to play the video material segment in the application display interface in response to a trigger operation on the application display interface.

For illustrative implementations of the video playing unit 801 and the material output unit 802, reference may be made to the description of step S207 in the embodiment corresponding to FIG. 9, and details are not described herein again.

For illustrative implementations of the data obtaining module 70 and the data output module 80, reference may be made to the description of step S201 and step S207 in the embodiment corresponding to FIG. 9, and details are not described herein again. In addition, beneficial effects achieved by using the same method are not described herein again.

Figure 15:
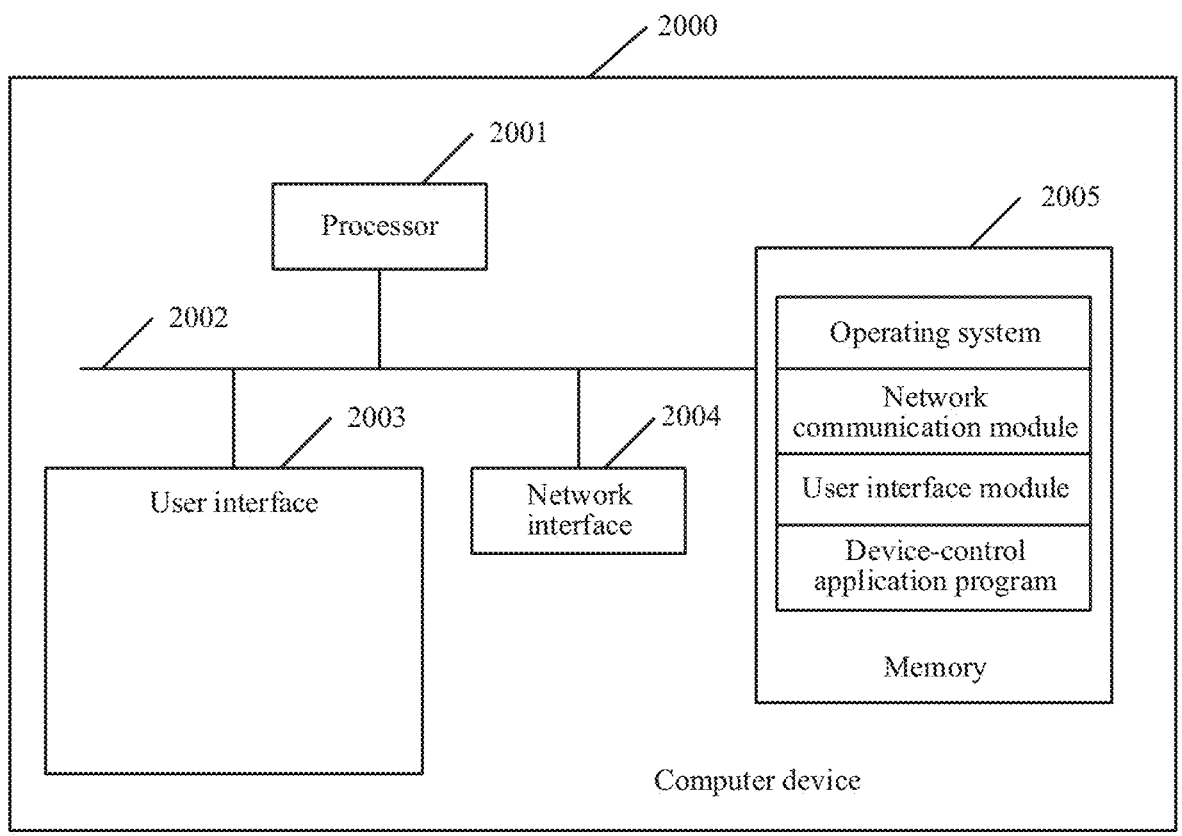
FIG. 15 is a schematic structural diagram of a computer device according to an embodiment of the disclosure.

FIG. 15 is a schematic structural diagram of a computer device according to an embodiment of the disclosure. As shown in FIG. 15, the electronic device 2000 may include: a processor 2001, a network interface 2004, and a memory 2005. In addition, the computer device 2000 may further include a user interface 2003 and at least one communication bus 2002. The communication bus 2002 is configured to implement connection and communication between these components. The user interface 2003 may further include a standard wired interface and wireless interface. In an implementation, the network interface 2004 may include a standard wired interface and a standard wireless interface (such as a Wi-Fi interface). The memory 2005 may be a high-speed RAM, or may be a non-volatile memory, for example, at least one magnetic disk memory. In an implementation, the memory 2005 may further be at least one storage apparatus that is located far away from the processor 2001. As shown in FIG. 15, the memory 2005 used as a computer-readable storage medium may include an operating system, a network communication module, a user interface module, and a device-control application program.

In the computer device 2000 shown in FIG. 15, the network interface 2004 may provide a network communication function; the user interface 2003 is mainly configured to provide an input interface for a user, and the processor 2001 may be configured to invoke the device-control application program stored in the memory 2005.

It is to be understood that, the computer device 2000 described in the embodiments of the disclosure may be a server or a user terminal, which is not limited herein. It may be understood that the computer device 2000 may be configured to perform the description of the video data processing method in the embodiment corresponding to FIG. 3 or FIG. 9, and details are not described herein again. In addition, beneficial effects achieved by using the same method are not described herein again.

In addition, an embodiment of the disclosure further provides a computer-readable storage medium. The computer-readable storage medium stores a computer program executed by the video data processing apparatus 1 or the video data processing apparatus 2 mentioned above, and the computer program includes program instructions. When executing the program instructions, the processor may perform the description of the video data processing method in the embodiment corresponding to FIG. 3 or FIG. 9. Therefore, details are not described herein again. In addition, beneficial effects achieved by using the same method are not described herein again. For technical details that are not disclosed in the embodiments of the computer-readable storage medium of the disclosure, reference may be made to the method embodiments of the disclosure.

Figure 16:
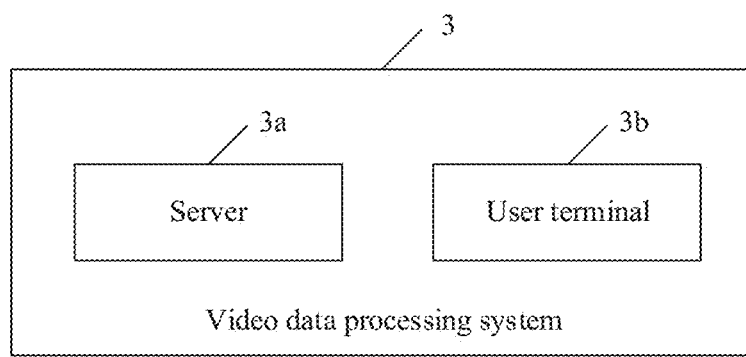
FIG. 16 is a video data processing system according to an embodiment of the disclosure.

FIG. 16 is a video data processing system according to an embodiment of the disclosure. The video data processing system 3 may include a server 3a and a user terminal 3b, and the server 3a may be the video data processing apparatus 1 in the embodiment corresponding to FIG. 13; and the user terminal 3b may be the video data processing apparatus 2 in the embodiment corresponding to FIG. 14. It may be understood that, beneficial effects achieved by using the same method are not described herein again.

In addition, an embodiment of the disclosure further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the description of the video data processing method in the embodiment corresponding to FIG. 3 or FIG. 9. Therefore, details are not described herein again. In addition, beneficial effects achieved by using the same method are not described herein again. For technical details that are not disclosed in the embodiment of the computer program product or the computer program of the disclosure, reference may be made to the descriptions of the method embodiments of the disclosure.

It may be understood that, in an example implementation of the disclosure, when relating to behavior data associated with the user and data related to the user portrait, when the foregoing embodiments of the disclosure are applied to specific products or technologies, user's permission or agreement needs to be obtained, and acquisition, use, and processing of the related data need to conform to related laws and regulations and standards in related nations and regions.

A person of ordinary skill in the art would understand that all or some of the procedures of the methods in the foregoing embodiments may be implemented by a computer program instructing relevant hardware. The computer program may be stored in a computer-readable storage medium. When the program is executed, the procedures of the foregoing method embodiments may be included. The foregoing storage medium may be a magnetic disc, an optical disc, a read-only memory (ROM), a random access memory (RAM), or the like.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The foregoing disclosure is merely example embodiments of the disclosure, and certainly is not intended to limit the protection scope of the disclosure. Therefore, equivalent variations made in accordance with the claims of the disclosure shall fall within the scope of the disclosure.

What is claimed is:

1. A video data processing method, performed by a computer device, the method comprising: obtaining video data of a target video requested by a target user, and performing video analysis on the video data to obtain a plurality of video segments, the video analysis comprising storyboard processing and attribute analysis based on a plurality of preset segment attribute tags, and each video segment in the plurality of video segments corresponding to one segment attribute tag and one storyboard segment; determining a video template associated with the target user from a video template database based on a user portrait of the target user, and obtaining at least one template segment and a template tag sequence in the video template, the template tag sequence being based on a template attribute tag of the at least one template segment; screening at least one video segment matching the template attribute tag of the at least one template segment from the plurality of video segments based on the template attribute tag of the at least one template segment and segment attribute tags corresponding to the plurality of video segments; splicing the at least one matched video segment according to a position of a template attribute tag, of each template segment in the at least one template segment, in the template tag sequence, as a video material segment of the target video; and pushing the video data and the video material segment to an application client corresponding to the target user, to be output, wherein the performing the video analysis comprises: performing the storyboard processing on a video sequence corresponding to the video data through a video partitioning component, to obtain a plurality of storyboard segments associated with the video sequence; inputting the plurality of storyboard segments into a network recognition model, and performing the attribute analysis on the plurality of storyboard segments through the network recognition model based on the plurality of preset segment attribute tags, to obtain segment attribute tags corresponding to the plurality of storyboard segments; and determining the plurality of storyboard segments comprising the segment attribute tags as the plurality of video segments of the video data, wherein the performing the storyboard processing comprises: determining a first video frame serving as a cluster centroid in the video sequence through the video partitioning component, and generating storyboard cluster information of a storyboard cluster to which the first video frame belongs; determining video frames other than the first video frame in the video sequence as second video frames, sequentially obtaining each second video frame in the second video frames based on a pooling mechanism, and determining an image similarity between each second video frame and the first video frame; and determining a storyboard cluster to which each video frame in the video sequence belongs based on a result of the image similarity, and forming each video frame in the video sequence into the plurality of storyboard segments based on the storyboard cluster information of the storyboard cluster to which each video frame in the video sequence belongs, and wherein the determining the storyboard cluster to which each video frame in the video sequence belongs comprises: based on the image similarity between the first video frame and a second video frame being greater than or equal to a clustering threshold, allocating the second video frame whose image similarity is greater than or equal to the clustering threshold to the storyboard cluster to which the first video frame belongs; and based on the image similarity between the first video frame and a second video frame being less than the clustering threshold, updating the first video frame using the second video frame whose image similarity is less than the clustering threshold, generating storyboard cluster information of a storyboard cluster to which the updated first video frame belongs, and sequentially performing image similarity matching between the updated first video frame and second video frames that were not previously matched until image similarity matching is performed on each video frame in the video sequence, to obtain storyboard cluster information of a storyboard cluster to which each second video frame in the video sequence belongs.

2. The method according to claim 1, further comprising, prior to the obtaining the video data of the target video:

extracting, in response to receiving a video playing request for the target video from the application client, a video identifier of the target video from the video playing request; and obtaining the video data of the target video by searching a video service database based on the video identifier.

3. The method according to claim 1, wherein the network recognition model comprises a first network model comprising a first attribute tag extraction function, a second network model comprising a second attribute tag extraction function, and a third network model comprising a third attribute tag extraction function; and the inputting the plurality of storyboard segments into the network recognition model and the performing the attribute analysis comprises:

inputting the plurality of storyboard segments into the first network model, performing long shot and close shot analysis on each storyboard segment in the plurality of storyboard segments through the first network model to obtain long shot and close shot tags of the plurality of storyboard segments, using the long shot and close shot tags of the plurality of storyboard segments as a first attribute tag outputted by the first network model, and using storyboard segments comprising the first attribute tag as storyboard segments of a first type;

inputting the storyboard segments of the first type into the second network model, and performing face detection on each storyboard segment in the storyboard segments of the first type through the second network model to obtain a face detection result;

using, based on the face detection result indicating that a face of a target character exists in the storyboard segments of the first type, storyboard segments corresponding to the face of the target character existing in the storyboard segments of the first type as storyboard segments of a second type, determining a character tag to which the target character in the storyboard segments of the second type belongs through the second network model, and determining the character tag to which the target character belongs as a second attribute tag of the storyboard segments of the second type, wherein the target character is one or more characters in the target video;

determining storyboard segments other than the storyboard segments of the second type in the storyboard segments of the first type as storyboard segments of a third type, inputting the storyboard segments of the third type into the third network model, and performing scene detection on each storyboard segment in the storyboard segments of the first type through the third network model to obtain a third attribute tag of the storyboard segments of the third type; and determining a segment attribute tag corresponding to each storyboard segment in the plurality of storyboard segments according to the first attribute tag of the storyboard segments of the first type, the second attribute tag of the storyboard segments of the second type, and the third attribute tag of the storyboard segments of the third type.

4. The method according to claim 1, wherein the determining the video template and the obtaining the at least one template segment and the template tag sequence in the video template comprises:

obtaining a behavior log table of the target user, and extracting behavior data information associated with the target user from the behavior log table;

performing user portrait analysis on the behavior data information to obtain the user portrait used for representing the target user; and determining the video template associated with the target user from the video template database based on the user portrait of the target user, and obtaining the at least one template segment and the template tag sequence in the video template.

5. The method according to claim 1, wherein a number of the at least one template segment is N, and N is a positive integer greater than 1; the template tag sequence comprises N sequence positions, one sequence position corresponds to one template attribute tag, and one template attribute tag corresponds to one template segment; and wherein the screening the at least one video segment matching the template attribute tag of the at least one template segment comprises:

using each of N template segments as a target template segment, determining a queue position of the target template segment in the template tag sequence as a target queue position, and determining a template attribute tag corresponding to the target queue position as a target template attribute tag;

screening a segment attribute tag matching the target template attribute tag from the segment attribute tags corresponding to the plurality of video segments, and determining one or more video segments corresponding to the screened segment attribute tag as candidate video segments; and performing similarity analysis on each candidate video segment in the candidate video segments and the target template segment to obtain a similarity threshold between each candidate video segment and the target template segment, determining a maximum similarity threshold in the similarity thresholds, and determining a candidate video segment corresponding to the maximum similarity threshold as a target candidate video segment matching the target template segment.

6. The method according to claim 5, wherein the splicing the at least one matched video segment comprises:

determining a target tag sequence formed by a segment attribute tag corresponding to the target candidate video segment based on the target queue position of the target template segment in the template tag sequence, and performing splicing processing on all target candidate video segments associated with the target tag sequence to obtain the video material segment.

7. The method according to claim 6, wherein the performing the splicing processing on all the target candidate video segments comprises:

performing video splicing processing on all the target candidate video segments associated with the target tag sequence to obtain spliced video data associated with the N template segments; and obtaining template audio data associated with the N template segments, and performing audio and video combination processing on the template audio data and the spliced video data through an audio and video combination component to obtain the video material segment.

8. A video data processing method, comprising: obtaining, in response to a play operation performed by a target user on a target video in an application client, video data of the target video and a video material segment associated with the target video from a server, wherein the video material segment is a plurality of video segments obtained by video analysis performed by the server on the video data, the video analysis comprises storyboard processing and attribute analysis based on a plurality of preset segment attribute tags, and each video segment in the plurality of video segments corresponds to one segment attribute tag and one storyboard segment; a video template associated with the target user is determined from a video template database based on a user portrait of the target user, and at least one template segment and a template tag sequence in the video template are obtained, wherein the template tag sequence is formed by a template attribute tag of the at least one template segment; at least one video segment matching the template attribute tag of the at least one template segment is screened from the plurality of video segments based on the template attribute tag of the at least one template segment and segment attribute tags corresponding to the plurality of video segments; and the video material segment is obtained by splicing the at least one matched video segment according to a position of a template attribute tag, of each template segment in the at least one template segment, in the template tag sequence; and outputting the video data and the video material segment in an application display interface of the application client, wherein the performing the video analysis comprises: performing the storyboard processing on a video sequence corresponding to the video data through a video partitioning component, to obtain a plurality of storyboard segments associated with the video sequence; inputting the plurality of storyboard segments into a network recognition model, and performing the attribute analysis on the plurality of storyboard segments through the network recognition model based on the plurality of preset segment attribute tags, to obtain segment attribute tags corresponding to the plurality of storyboard segments; and determining the plurality of storyboard segments comprising the segment attribute tags as the plurality of video segments of the video data, wherein the performing the storyboard processing comprises: determining a first video frame serving as a cluster centroid in the video sequence through the video partitioning component, and generating storyboard cluster information of a storyboard cluster to which the first video frame belongs; determining video frames other than the first video frame in the video sequence as second video frames, sequentially obtaining each second video frame in the second video frames based on a pooling mechanism, and determining an image similarity between each second video frame and the first video frame; and determining a storyboard cluster to which each video frame in the video sequence belongs based on a result of the image similarity, and forming each video frame in the video sequence into the plurality of storyboard segments based on the storyboard cluster information of the storyboard cluster to which each video frame in the video sequence belongs, and wherein the determining the storyboard cluster to which each video frame in the video sequence belongs comprises: based on the image similarity between the first video frame and a second video frame being greater than or equal to a clustering threshold, allocating the second video frame whose image similarity is greater than or equal to the clustering threshold to the storyboard cluster to which the first video frame belongs; and based on the image similarity between the first video frame and a second video frame being less than the clustering threshold, updating the first video frame using the second video frame whose image similarity is less than the clustering threshold, generating storyboard cluster information of a storyboard cluster to which the updated first video frame belongs, and sequentially performing image similarity matching between the updated first video frame and second video frames that were not previously matched until image similarity matching is performed on each video frame in the video sequence, to obtain storyboard cluster information of a storyboard cluster to which each second video frame in the video sequence belongs.

9. The method according to claim 8, wherein the obtaining the video data of the target video and the video material segment associated with the target video from the server comprises:

generating, in response to the play operation performed by the target user on the target video in the application client, a video playing request used for requesting to play the target video, and transmitting the video playing request to the server, wherein the video playing request includes a video identifier of the target video; and receiving the video data and the video material segment associated with the target video returned by the server based on the video playing request, wherein the video material segment is obtained after video analysis and video matching are performed on the video data by the server according to the video template based on the video template that is determined according to the user portrait of the target user, and the user portrait is determined according to user behavior information of the target user in the application client.

10. The method according to claim 8, wherein the outputting the video data and the video material segment comprises:

determining a video playing interface used for playing the video data in the application display interface of the application client, and playing the video data in the video playing interface; and playing the video material segment in the application display interface in response to a trigger operation on the application display interface.

11. A video data processing apparatus, comprising: at least one memory configured to store program code; and at least one processor configured to read the program code and operate as instructed by the program code, the program code including: segment generation code configured to cause at least one of the at least one processor to obtain video data of a target video requested by a target user, and perform video analysis on the video data to obtain a plurality of video segments, the video analysis comprising storyboard processing and attribute analysis based on a plurality of preset segment attribute tags, and each video segment in the plurality of video segments corresponding to one segment attribute tag and one storyboard segment; template obtaining code configured to cause at least one of the at least one processor to determine a video template associated with the target user from a video template database based on a user portrait of the target user, and obtain at least one template segment and a template tag sequence in the video template, the template tag sequence being based on a template attribute tag of the at least one template segment; material determining code configured to cause at least one of the at least one processor to screen at least one video segment matching the template attribute tag of the at least one template segment from the plurality of video segments based on the template attribute tag of the at least one template segment and segment attribute tags corresponding to the plurality of video segments, and splice the at least one matched video segment according to a position of a template attribute tag, of each template segment in the at least one template segment, in the template tag sequence as a video material segment of the target video; and data transmission code configured to cause at least one of the at least one processor to push the video data and the video material segment to an application client corresponding to the target user, to be output, wherein the performing the video analysis comprises: performing the storyboard processing on a video sequence corresponding to the video data through a video partitioning component, to obtain a plurality of storyboard segments associated with the video sequence; inputting the plurality of storyboard segments into a network recognition model, and performing the attribute analysis on the plurality of storyboard segments through the network recognition model based on the plurality of preset segment attribute tags, to obtain segment attribute tags corresponding to the plurality of storyboard segments; and determining the plurality of storyboard segments comprising the segment attribute tags as the plurality of video segments of the video data, wherein the performing the storyboard processing comprises: determining a first video frame serving as a cluster centroid in the video sequence through the video partitioning component, and generating storyboard cluster information of a storyboard cluster to which the first video frame belongs; determining video frames other than the first video frame in the video sequence as second video frames, sequentially obtaining each second video frame in the second video frames based on a pooling mechanism, and determining an image similarity between each second video frame and the first video frame; and determining a storyboard cluster to which each video frame in the video sequence belongs based on a result of the image similarity, and forming each video frame in the video sequence into the plurality of storyboard segments based on the storyboard cluster information of the storyboard cluster to which each video frame in the video sequence belongs, and wherein the determining the storyboard cluster to which each video frame in the video sequence belongs comprises: based on the image similarity between the first video frame and a second video frame being greater than or equal to a clustering threshold, allocating the second video frame whose image similarity is greater than or equal to the clustering threshold to the storyboard cluster to which the first video frame belongs; and based on the image similarity between the first video frame and a second video frame being less than the clustering threshold, updating the first video frame using the second video frame whose image similarity is less than the clustering threshold, generating storyboard cluster information of a storyboard cluster to which the updated first video frame belongs, and sequentially performing image similarity matching between the updated first video frame and second video frames that were not previously matched until image similarity matching is performed on each video frame in the video sequence, to obtain storyboard cluster information of a storyboard cluster to which each second video frame in the video sequence belongs.

12. The apparatus according to claim 11, wherein the program code further comprises, prior to the obtaining the video data of the target video:

extracting, in response to receiving a video playing request for the target video from the application client, a video identifier of the target video from the video playing request; and obtaining the video data of the target video by searching a video service database based on the video identifier.

13. A computing device, comprising a processor, a memory, and a network interface, the processor being connected to the memory and the network interface, the network interface being configured to provide a data communication function, the memory being configured to store a computer program, the processor being configured to invoke the computer program to perform the method according to claim 8.

14. A non-transitory computer-readable storage medium, storing a computer program, the computer program being executable by at least one processor to perform the method according to claim 1.

15. A non-transitory computer-readable storage medium, storing a computer program, the computer program being executable by at least one processor to perform the method according to claim 8.

* * * * *